(12) United States Patent
Katsuragi et al.

(10) Patent No.: US 6,827,434 B1
(45) Date of Patent: Dec. 7, 2004

(54) LIQUID COMPOSITION, INK FOR INK-JET, INK SET FOR INK-JET RECORDING, INK-JET RECORDING METHOD, RECORDING UNIT, INK CARTRIDGE, AND INK-JET RECORDING APPARATUS

(75) Inventors: Ryuji Katsuragi, Tokyo (JP); Makoto Shioya, Kanagawa (JP); Hideto Yokoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/453,724

(22) Filed: Jun. 4, 2003

Related U.S. Application Data

(62) Division of application No. 09/955,262, filed on Sep. 19, 2001, now Pat. No. 6,607,266.

(30) Foreign Application Priority Data

Sep. 25, 2000 (JP) .......................................... 2000-290559
Sep. 26, 2000 (JP) .......................................... 2000-292968

(51) Int. Cl.$^7$ .......................... G01D 11/00; C09D 11/00
(52) U.S. Cl. .................................... 347/100; 106/31.13
(58) Field of Search ............................. 347/96, 98, 100; 156/31.13, 31.27, 31.95, 31.75, 31.43

(56) References Cited

U.S. PATENT DOCUMENTS

| | | | |
|---|---|---|---|
| 3,776,742 A | 12/1973 | Sanders | |
| 4,450,457 A | 5/1984 | Miyachi et al. | 347/64 |
| 4,732,613 A | 3/1988 | Shioya et al. | |
| 5,198,023 A | 3/1993 | Stoffel | |
| 5,428,383 A | 6/1995 | Shields et al. | 347/96 |
| 5,462,590 A | 10/1995 | Yui et al. | |
| 5,488,402 A | 1/1996 | Shields et al. | 347/96 |
| 5,679,143 A | 10/1997 | Looman | |
| 5,769,930 A | 6/1998 | Sano et al. | 106/31.36 |
| 6,001,161 A * | 12/1999 | Evans et al. | 106/31.48 |
| 6,084,619 A | 7/2000 | Takemoto et al. | 347/96 |
| 6,086,197 A | 7/2000 | Kubota et al. | 347/96 |
| 6,394,594 B1 | 5/2002 | Katsuragi et al. | 347/100 |
| 6,471,350 B2 | 10/2002 | Katsuragi et al. | 347/100 |
| 6,513,922 B2 | 2/2003 | Katsuragi et al. | 347/100 |
| 6,533,398 B2 | 3/2003 | Katsuragi et al. | 347/56 |
| 6,533,406 B2 | 3/2003 | Katsuragi et al. | 347/96 |
| 6,550,903 B2 | 4/2003 | Katsuragi et al. | 347/96 |

FOREIGN PATENT DOCUMENTS

| | | |
|---|---|---|
| EP | 0 463 737 A2 | 1/1992 |
| EP | 0 534 634 A1 | 3/1993 |
| EP | 0 687 716 A1 | 12/1995 |
| EP | 0 726 158 | 8/1996 |
| JP | 5-186704 | 7/1993 |
| JP | 5-202328 | 8/1993 |
| JP | 6-106841 | 4/1994 |
| JP | 6-220386 | 8/1994 |
| JP | 8-3498 | 1/1996 |

OTHER PUBLICATIONS

Output Hardcopy Devices, Durbeck, R. and Sherr, S., p. 341, 1988.

* cited by examiner

Primary Examiner—Michael S. Brooke
(74) Attorney, Agent, or Firm—Fitzpatrick, Cella, Harper & Scinto

(57) ABSTRACT

A liquid composition for ink-jet recording, or an ink set for ink-jet recording which produces an image having water resistance and excellent print quality, and which can reduce color bleeding that occurs in formation of color images, and furthermore, which can extend a life-span of ink-jet recording heads, as well as an ink-jet recording method, a recording unit, an ink cartridge and an ink-jet recording apparatus are provided. The liquid composition or a color ink constituting the ink set comprising a polyvalent metal salt, a material selected from the group consisting of acids including amino groups and salts thereof, and a liquid medium is used.

22 Claims, 7 Drawing Sheets

LIQUID COMPOSITION, INK FOR INK-JET, INK SET FOR INK-JET RECORDING, INK-JET RECORDING METHOD, RECORDING UNIT, INK CARTRIDGE, AND INK-JET RECORDING APPARATUS

This is a divisional application of application Ser. No. 09/955,262, filed Sep. 19, 2001 now U.S. Pat. No. 6,607,266.

BACKGROUND OF THE INVENTION

1. Field of the Invention

The present invention relates to a liquid composition, an ink for ink-jet, an ink set for ink-jet recording, an ink-jet recording method, a recording unit, an ink cartridge, and an ink-jet recording apparatus. In particular, the present invention relates to a liquid composition, which: has water resistance and excellent print quality; reduces color bleeding that occurs in formation of color images; and can extend a life-span of ink-jet recording heads using thermal energy, as well as to an ink for ink-jet, an ink set for ink-jet recording, an ink-jet recording method using one of these, a recording unit, an ink cartridge, and an ink-jet recording apparatus.

2. Description of Background Art

The ink-jet recording method makes it easy to miniaturize an apparatus, to reduce running cost, to colorize, etc., and has the superiority in the formation of color images, although there are some problems under circumstances where improvement of image quality is further required. For example, when two different inks are applied on a recording medium adjacently to each other, there is a problem in that those inks are mixed with each other at the boundary therebetween, and as a consequence, a phenomenon of degradation of color image quality (bleeding) occurs. In particular, since color mixing at the boundary between black ink and color ink has a large effect on the degradation of image quality, various methods for solving the problems have been developed.

For example, as described in Japanese Patent Laid-Open No. 5-202328, U.S. Pat. No. 5,198,023, and Japanese Patent Laid-Open No. 6-106841, a technique for controlling the color bleeding by concurrent use of a first liquid containing a precipitant and a second liquid containing a coloring agent, which can produce precipitates by the precipitant, has been disclosed. As this precipitant, polyvalent metal salts have been disclosed, and as the coloring agent, which can produce precipitates by the polyvalent metal salts, dyes including at least one carboxylic group, etc., have been disclosed. Furthermore, the first liquid may include the coloring agent, and in this case, the first liquid can also be used as the ink.

SUMMARY OF THE INVENTION

However, according to research by the inventors of the present invention, it was discovered that when a solution containing a polyvalent metal salt, as described in Japanese Patent Laid-Open No. 5-202328 in order to prevent the aforementioned bleeding, was repeatedly ejected by a bubble-jet method, sometimes, kogation derived from the polyvalent metal salt were formed on a heater contacting with the solution containing the polyvalent metal salt. As a result, the quantity of the ejected liquid droplets and the speed of the ejected liquid droplets were reduced compared to those at the initial stage so as to cause a problem in that the image quality was affected. In addition, it has been observed that kogation sometimes causes breaks in the heater so as to prevent ejection of the polyvalent metal salt solution.

It is believed that the cause of the aforesaid ejection problems is the overheating of the ink or the liquid composition containing polyvalent metal salts, by the heater, which volatizes or breaks down the anions constituting the polyvalent metal salts, and therefore, increasing the concentration of cation ions (polyvalent metal ions) around the heater. As a result, the alkalinity is also increased causing the outermost surface protection film, typically made of a metal, such as, for example, tantalum, and metal oxides, to dissolve.

Therefore, the inventors of the present invention earnestly researched regarding liquid compositions or inks which: have an effect of alleviating bleeding; prevent breaks of heaters and kogation; and can extend a life-span of recording heads. As a consequence, the present invention has been made. Accordingly, it is an object of the present invention to provide a liquid composition which can extend the life-span of an ink-jet recording head and can form high-quality images when used in an ink-jet recording method together with an ink.

Another object of the present invention is to provide an ink set which can extend the life-span of an ink-jet recording head, and can form high quality images.

A further object of the present invention is to provide an ink-jet recording method, a recording unit, an ink cartridge, and an ink-jet recording apparatus which can provide high quality images and extend the life-span of an ink-jet recording head.

The above objects are achieved by the present invention as described below.

According to one aspect of the present invention, there is provided a liquid composition for ink-jet recording which is used together with a color ink and reacts with the color ink when it comes into contact with the color ink, the liquid composition comprising (a) a polyvalent metal salt, (b) a material selected from the group consisting of acids including amino groups and salts thereof, and (c) a liquid medium.

According to another aspect of the present invention, there is provided an ink-jet recording method comprising the steps of: (i) ejecting aforementioned liquid composition toward a recording medium by applying energy to the liquid composition; and (ii) ejecting aforementioned color ink toward a recording medium by applying energy to the color ink, wherein the steps are performed so that the liquid composition and the color ink form a contact state on the recording medium.

According to further aspect of the present invention, there is provided an ink set for ink-jet recording comprising: (1) the aforementioned liquid composition and (2) a color ink which comprises a coloring material and a liquid medium, and reacts with the liquid composition by contact with the liquid composition.

According to still further aspect of the present invention, there is provided a recording unit comprising: a liquid composition container portion containing the aforementioned liquid composition; an ink container portion containing a color ink which reacts with the liquid composition by contact with said liquid composition; and an ink-jet recording head for ejecting each of the liquid composition and the color ink by applying energy to the liquid composition and the color ink.

According to still further aspect of the present invention, there is provided an ink cartridge comprising: a liquid composition container portion containing the aforementioned liquid composition; and an ink container portion containing a color ink which comprises a coloring material and a liquid medium, and reacts with the liquid composition by contact with the liquid composition.

According to still further aspect of the present invention, there is provided an ink-jet recording apparatus comprising: a liquid composition container portion containing a liquid composition is an ink container portion containing a color ink which reacts with the liquid composition by contact with the liquid composition; and an ink-jet recording head for ejecting each of the liquid composition and the color ink by applying energy to the liquid composition and the color ink, wherein the liquid composition is the aforementioned liquid composition.

According to still further aspect of the present invention, there is provided an ink set for ink-jet recording comprising: (1) a color ink comprising a coloring material, a liquid medium, a polyvalent metal salt, and a material selected from the group consisting of acids including amino groups and salts thereof; and (2) a black ink which comprises a coloring material and a liquid medium, and reacts with the color ink by contact with the color ink.

According to still further aspect of the present invention, there is provided an ink-jet recording method comprising the steps of: (i) ejecting the aforementioned black ink toward a recording medium by applying energy to the black ink; and (ii) ejecting the aforementioned color ink toward a recording medium by applying energy to the color ink, wherein the steps are performed so that the black ink and the color ink form a contact state on the recording medium.

According to another aspect of the present invention, there is provided a recording unit comprising ink container portions containing each of the inks constituting an ink set and an ink-jet recording head for ejecting each of the inks supplied from the ink container portions by applying energy to the inks.

According to further aspect of the present invention, there is provided an ink cartridge comprising ink container portions containing each of the inks constituting an ink set.

According to still further aspect of the present invention, there is provided an ink-jet recording apparatus comprising: an ink container portion containing an ink set comprising at least a black ink and a color ink; and an ink-jet recording head for ejecting each of the inks supplied from the ink container portion by applying energy to the inks, wherein the ink set is the aforementioned ink set.

According to still further aspect of the present invention, there is provided an ink for ink-jet comprising:

(a) a polyvalent metal salt, (b) a material selected from the group consisting of acids including amino groups and salts thereof, (c) a coloring material, and (d) a liquid medium.

Further objects, features and advantages of the present invention will become apparent from the following description of the preferred embodiments with reference to the attached drawings.

DESCRIPTION OF THE PREFERRED EMBODIMENTS

Figure 1:
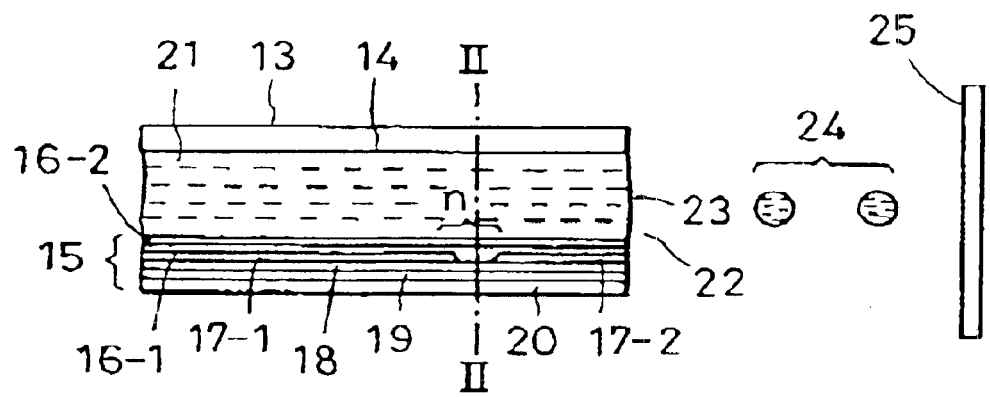
FIG. 1 is a vertical sectional view of an embodiment of a recording head of an ink-jet recording apparatus according to the present invention.

The present invention will be explained below in detail using preferred embodiments.

First Embodiment

In accordance with a preferred embodiment of the present invention, recording is performed by applying: (1) a liquid composition composed of (a) a polyvalent metal salt, (b) a material selected from the group consisting of acids including amino groups and salts thereof, and (c) a liquid medium; and (2) a color ink on a recording medium so as to contact each other. The liquid composition preferably does not affect the color tone of the color ink in a recording image.

The (a) polyvalent metal salt will be described. Examples of suitable polyvalent metal salts include, magnesium salts, calcium salts, barium salts, iron(II) salts, copper(II) salts, zinc salts, aluminum salts, etc., of inorganic acids, for example, hydrochloric acid, nitric acid, and sulfuric acid, organic acids, for example, acetic acid and hydroxycarboxylic acid, or polyol phosphate. Among these polyvalent metal salts, those having a high solubility relative to the liquid medium such as, for example magnesium salts and calcium salts of nitric acid, magnesium salts and calcium salts of acetic acid, magnesium salts and calcium salts of hydroxycarboxylic acid, and magnesium salts and calcium salts of polyol phosphate are preferred.

Regarding the aforementioned hydroxycarboxylic acid, suitable examples include, aldaric acids (polyoxydicarboxylic acids), e.g., lactic acid, malic acid, citric acid, and tartaric acid, and aldonic acids, e.g., gluconic acid. Among these hydroxycarboxylic acids, polyvalent metal salts of aldonic acids, which have superior solubility and high degree of safety, are preferred.

The polyvalent metal salts of aldonic acids will be described in more detail below. The aldonic acids are polyoxycarboxylic aids corresponding to aldoses in which aldehyde groups have been oxidized to carboxylic groups. Since the aldonic acids make soluble polyvalent metal salts by bonding with polyvalent metal ions of magnesium, calcium, etc., the aldonic acids are appropriately used as constituents of the liquid composition according to the present invention. The aldonic acids are represented by the following general formula.

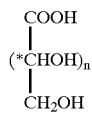

(Wherein n designates 0 or a positive integer, and *c designates an asymmetric carbon atom.)

As described above, since the aldonic acids have asymmetric carbon atoms, there are many optical isomers. The aldonic acids having 5 or more carbons (in the aforementioned general formula, n is 3 or more) are hardly present alone in aqueous solutions. It is said that, usually, a part of the aldonic acids form lactones with γ- or δ-hydroxyl groups, and become γ-aldonic lactones and δ-aldonic lactones, respectively, so as to present as a ternary equilibrium mixture of aldonic acids, γ-aldonic lactones, and δ-aldonic lactones. Likewise, the aldonic acids having 4 carbons (in the aforementioned general formula, n is 2) are hardly present alone in aqueous solutions. It is said that, usually, a part of the aldonic acids form lactones with γ-hydroxyl groups, and become respective γ-aldonic lactones, so as to present as a binary equilibrium mixture of aldonic acids and γ-aldonic lactones.

The aldonic acids are classified based on the number of carbons they contain. The aldonic acids having 4 carbons (in the aforementioned general formula, n is 2) are collectively called tetronic acid, the aldonic acids having 5 carbons (in the aforementioned general formula, n is 3) are collectively called pentonic acid, and the aldonic acids having 6 carbons (in the aforementioned general formula, n is 4) are collectively called hexonic acid. Specific examples of the aldonic acid include, for example, glycolic acid (sometimes called hydroxyacetic acid) having 2 carbons (in the aforementioned general formula, n is 0), glyceric acid having 3 carbons (in the aforementioned general formula, n is 1), erythronic acid and threonic acid having 4 carbons (in the aforementioned general formula, n is 2), ribonic acid, arabonic acid, xylonic acid, and lyxonic acid having 5 carbons (in the aforementioned general formula, n is 3), gluconic acid, allonic acid, altronic acid, mannonic acid, gulonic acid, idonic acid, galactonic acid, and talonic acid having 6 carbons (in the aforementioned general formula, n is 4), and glucoheptonic acid having 7 carbons (in the aforementioned general formula, n is 5). Further and some of these may have each of D body, L body, and DL body.

Among the aldonic acids suitable as constituents of the liquid composition according to the present invention, especially preferable is gluconic acid (in the aforementioned general formula, n is 4) which will be described. Cluconic acid has been widely used as a food additive, and it is harmless to the human body. Gluconic acid rarely present alone in aqueous solutions. It is said that, usually, a part of gluconic acid form lactones with γ- or δ-hydroxyl groups, and become y-gluconic lactone and δ-gluconic lactone, respectively, so as to present as a ternary equilibrium mixture of gluconic acid, γ-gluconic lactone, and δ-gluconic lactone. Regarding gluconic acid, there are D body, L body, and DL body, and any of these can be used, although D-glucose, which is D body, is generally easily available. There are, for example, allonic acid, altronic acid, mannonic acid, gulonic acid, idonic acid, galactonic acid, and talonic acid, as optical isomers of gluconic acid. Since these exhibit characteristics similar to those of gluconic acid, these may be used.

As the polyvalent metal salt of the aforementioned gluconic acid, magnesium gluconate, calcium gluconate, barium gluconate, iron(II) gluconate, copper(II) gluconate, etc., may be used, although the use of magnesium gluconate and calcium gluconate is preferred. Further, these compounds can be used alone or at least two of these can also be used concurrently.

The polyvalent metal salt of polyol phosphate will be described. Examples of suitable polyol phosphates include, for example, phosphate of polyol, monosaccharide, oligosaccharide, and polysaccharide, can be mentioned. Specifically, for example, glycerophosphoric acid, glucose-1-phosphate, glucose-6-phosphate, mannose-6-phosphate, galactose-6-phosphate, fructose-6-phosphate, glucose-1,6-diphosphate, fructose-1,6-diphosphate, ascorbic acid phosphate, sucrose phosphate, sorbitol phosphate, phosphorylated polyglycerin, and phosphorylated polyethylene glycol.

Among these, glycerophosphoric acid is preferable in the present embodiment, and will be described. Regarding glycerophosphoric acid, there are isomers, that is, α-glycerophosphoric acid and β-glycerophosphoric acid. In the present invention, either isomer can be used, and a mixture of the isomers may also be used. Suitable polyvalent metal salts of these glycerophosphoric acids include, for example, magnesium glycerophosphate, calcium glycerophosphate, barium glycerophosphate, iron(II) glycerophosphate, and copper(II) glycerophosphate. In particular, it is more preferable to use magnesium glycerophosphate and calcium glycerophosphate.

In the liquid composition according to the present invention, the total content of at least one compound selected from the aforementioned polyvalent metal salts is preferably 0.005% to 20% by mass based on the total amount of the liquid composition, more preferably is 0.05% to 12% by mass based on the total amount of the liquid composition, in order to achieve superior effect of reducing the bleeding and superior durability of the head.

Next, (b) a material selected from the group consisting of acids including amino groups and salts thereof, which constitutes the liquid composition according to the present invention, will be explained. Suitable acids including the amino group include, for example, amidosulturic acid (sometimes called sulfamic acid), aminomethanesulfonic acid, taurine (sometimes called 2-aminoethanesulfonic acid), carbanic acid, glycine, alanine, β-alanine, aspartic acid, glutamic acid, sulfanilic acid, phenylalanine, leucine, isoleucine, threonine, tryptophan, valine, methionine, lysine, and arginine.

Among these, from the viewpoint of solubility relative to the liquid medium and available ease, it is preferable to use amidosulfuric acid (sulfamic acid), aminomethanesulfonic acid, taurine (2-aminoethanesulfonic acid), carbamic acid, glycine, alanine, β-alanine, aspartic acid and glutamic acid.

When the aforementioned salts of the acid including the amino group are used, commercially available salt compounds may be used, and organic acid salts formed by addition of alkali may be used. Suitable alkali agents include, for example, lithium hydroxide, sodium hydroxide, potassium hydroxide, aqueous ammonia (or ammonium hydroxide), magnesium hydroxide, calcium hydroxide, and organic amines (for example, triethanolamine, diethanolamine, monoethanolamine, diisopropanolamine, triisopropanolamine, tetramethylammoniumhydroxide, tetraethylammoniumhydroxide, and tetra-n-propylammoniumhydroxide). These compounds can be used alone, and at least two of these can also be used concurrently.

The total content of the aforementioned materials selected from the group consisting of acids including amino groups and salts thereof in the liquid composition is preferably between 0.005% to 20% by mass based on the total amount of the liquid composition, and more preferably is between 0.05% to 12% by mass based on the total amount of the liquid composition, in order to achieve superior effect of reducing the kogation and extending a life-span of heads.

The ink-jet recording method according to the present invention is an ink-jet recording method in which images are recorded on a recording medium by applying energy for ejection to the ink, and subsequently, by ejecting the ink. The liquid composition according to the present embodiment having the aforementioned configuration and the color ink as described below are used concurrently, and these are applied on a recording medium so as to form a contact state of the liquid composition and the color ink on the recording medium, and perform recording. The coloring material used for the color ink will be explained below.

The color ink used together with the liquid component according to the present embodiment will be explained. The color ink comprises at least a coloring material and a liquid medium. When this ink contacts with the liquid component according to the present embodiment, it reacts with polyvalent metal so as to cause coagulation or precipitation of coloring materials in the color ink, or cause increase in viscosity of the color ink. As the coloring material of the color ink, pigments and dyes can be used. As the pigment, inorganic pigments, organic pigments, and other every pigment can be used, and the following examples are mentioned.

Carbon Black

C.I. Pigment Yellow 1, 2, 3, 12, 13, 14, 16, 17, 73, 74, 75, 83, 93, 95, 97, 98, 114, 128, 129, 151, 154, and 195, C.I. Pigment Red 5, 7, 12, 48(Ca), 48(Mn), 57(Ca), 57:1, 57(Sr), 112, 122, 123, 168, 184, and 202, C.I. Pigment Blue 1, 2, 3, 15:3, 15:34, 16, 22, and 60, C.I. Vat Blue 4 and 6

When the aforementioned pigments are used as coloring materials, in order to stably disperse the pigments in the color inks, it is preferable to use dispersing agents. As the dispersing agent, macromolecular dispersing agents, surfactant dispersing agents, etc., can be used. Examples of suitable macromolecular dispersing agents include polyacrylates, styrene-acrylic acid copolymer salts, styrene-methacrylic acid copolymer salts, styrene-acrylic acid-acrylate copolymer salts, styrene-maleic acid copolymer salts, acrylate-maleic acid copolymer salts, styrene-methacrylsulfonic acid copolymer salts, vinylnaphthalene-maleic acid copolymer salts, β-naphthalenesulfonic acid formalin condensate salts, polyvinyl pyrrolidone, polyethylene glycol, and polyvinyl alcohol. Among these, it is preferable to use those having a weight average molecular weight of 1,000 to 30,000 and an acid value of 100 to 430. Examples of suitable surfactant dispersing agents include lauryl benzenesulfonates, lauryl sulfonates, lauryl benzenecarboxylates, lauryl naphthalenesulfonates, aliphatic amine salts, and polyethyleneoxide condensates. Regarding the usage of these dispersing agents, the content thereof preferably falls in the range satisfying the relationship, weight of the pigment:weight of the dispersing agent=10:5 to 10:0.5.

In the present embodiment, as the coloring material of the color ink, self-dispersion type carbon black as described in Japanese Patent Laid-Open No. 5-186704 and Japanese Patent Laid-Open No. 8-3498, the disclosures of which are incorporated herein by reference to the extent that they describe how water-soluble groups are introduced to the surface of the carbon black so as to make self-dispersion possible, can be used. When the aforementioned self-dispersion type carbon black is used as the coloring material, since the aforementioned dispersing agent is not necessarily used, the usage of the dispersing agent can be reduced or obviated altogether. It is believed that when the aforementioned pigment ink contacts with the liquid composition according to the present embodiment, pigments in the pigment ink promptly coagulate and precipitate due to salting out effect, etc., of polyvalent metal ions in the liquid composition, and as a consequent, the speed of fixation of the coloring material in the pigment ink to a recording medium is increased, and even when at least two inks having different colors are adjacently applied, bleeding is not likely to occur. In the present embodiment, when the state of dispersion of the pigment has become unstable based on the aforementioned function, it is assumed that reaction between the color ink and the liquid composition has occurred.

When the dye is used as the coloring material in the color ink according to the present embodiment, water-soluble dyes are preferably used. For example, direct dyes, acidic dyes, basic dyes, dispersion dyes, and other every dye can be used. As the color ink including the dye as the coloring material, the one, in which precipitation of the dye due to salting out effect, formation of salts or compounds, that are not likely to dissolve in water or are insoluble in water, due to the reaction between polyvalent ions and dyes, or fixation of the dye in the color ink to the recording medium due to combination of these functions promptly proceed by the contact with the liquid composition according to the present embodiment, is appropriately used. As the dye usable for the aforementioned color ink, a dye including at least one carboxyl group in the molecule is preferable, because when it contacts with the liquid composition according to the present embodiment, it is likely to react with the polyvalent metal salt in the liquid composition so as to form an insoluble salt or compound. Specifically, it is preferable to use dyes having structures as shown by the following Example Compounds 1 to 30, although the present invention is not limited to these.

EXAMPLE COMPOUND 1

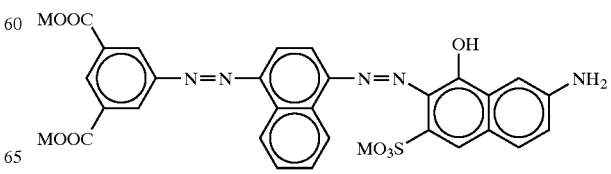

EXAMPLE COMPOUND 2
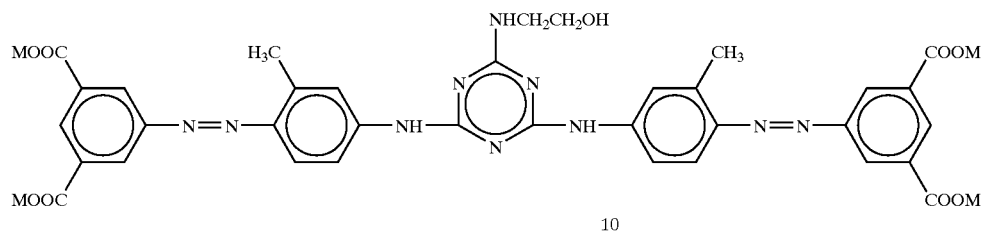
EXAMPLE COMPOUND 3
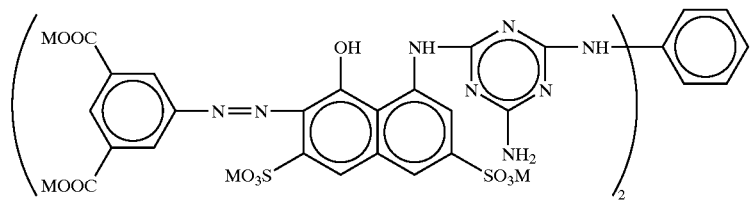
(Wherein M designates an alkali metal, an ammonium, or an organic ammonium.)
EXAMPLE COMPOUND 4
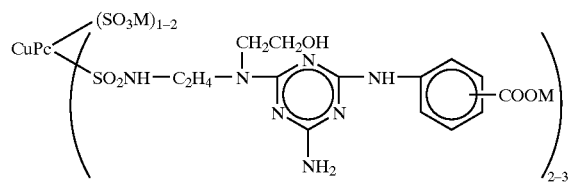
(wherein M designates an alkali metal, an ammonium, or an organic ammonium.)
EXAMPLE COMPOUND 5
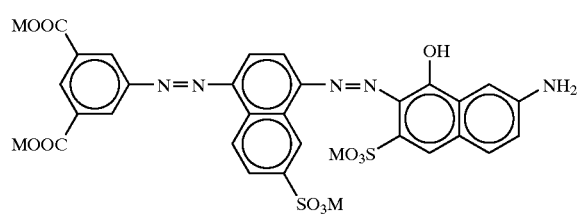
(Wherein M designates an alkali metal, an ammonium, or an organic ammonium.)
EXAMPLE COMPOUND 6
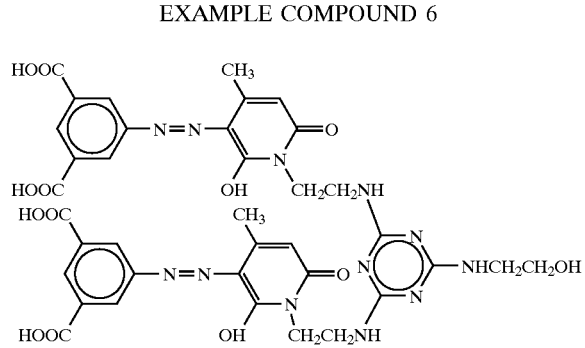
EXAMPLE COMPOUND 7
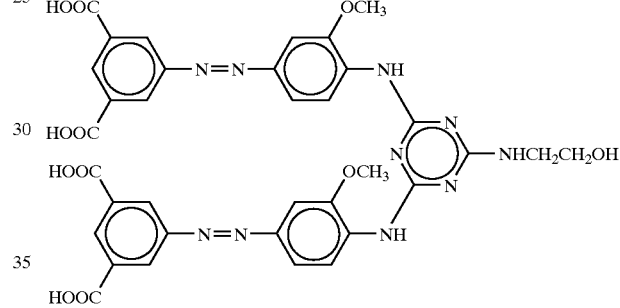
EXAMPLE COMPOUND 8
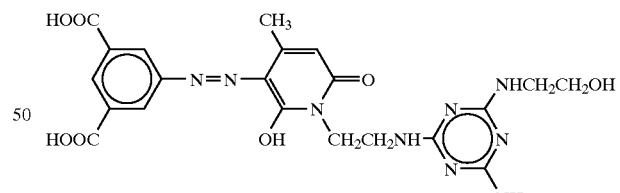
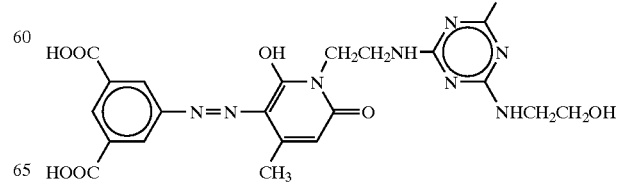

EXAMPLE COMPOUND 9
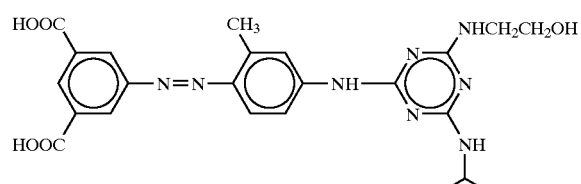
EXAMPLE COMPOUND 10
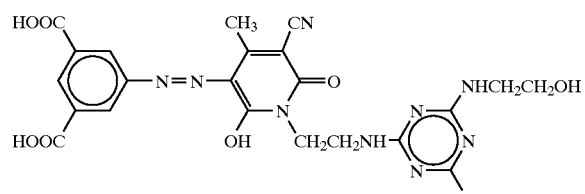
EXAMPLE COMPOUND 11
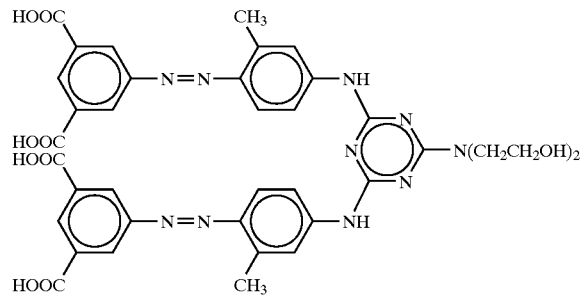
EXAMPLE COMPOUND 12
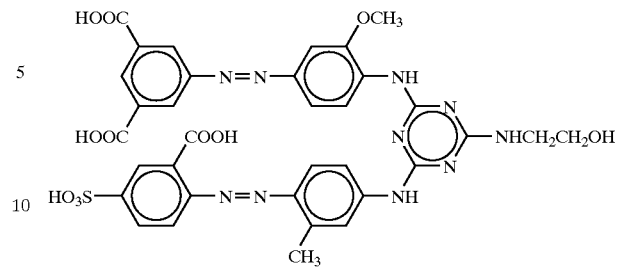
EXAMPLE COMPOUND 13
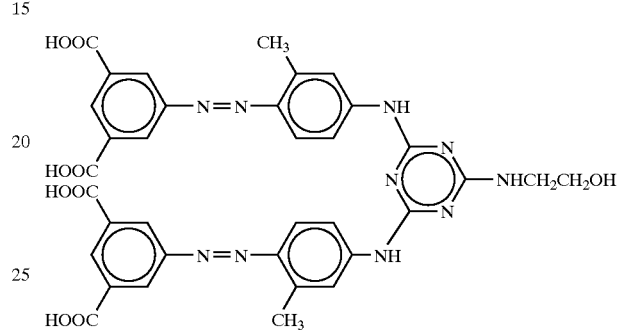
EXAMPLE COMPOUND 14
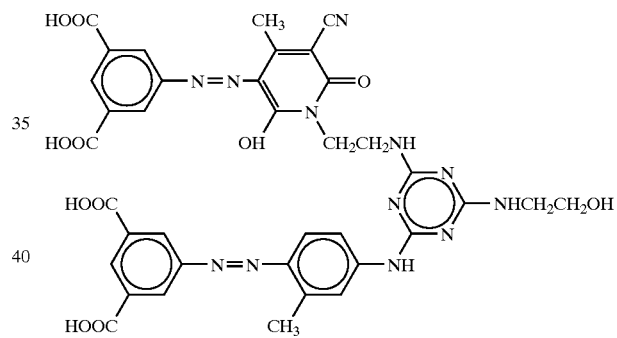
EXAMPLE COMPOUND 15
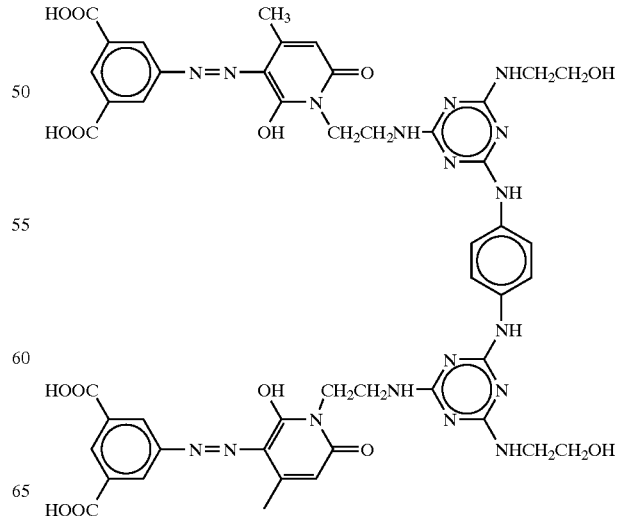

EXAMPLE COMPOUND 16
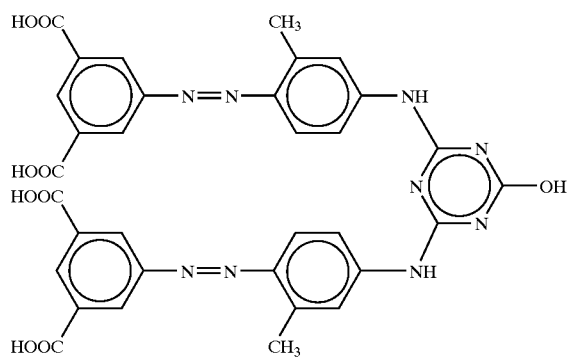
EXAMPLE COMPOUND 17
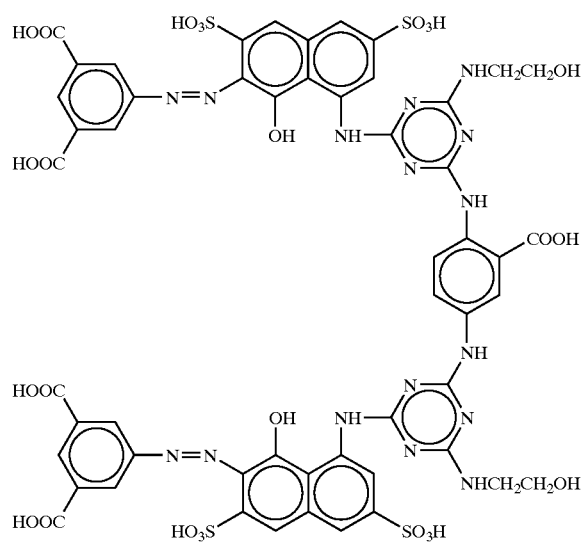
EXAMPLE COMPOUND 18
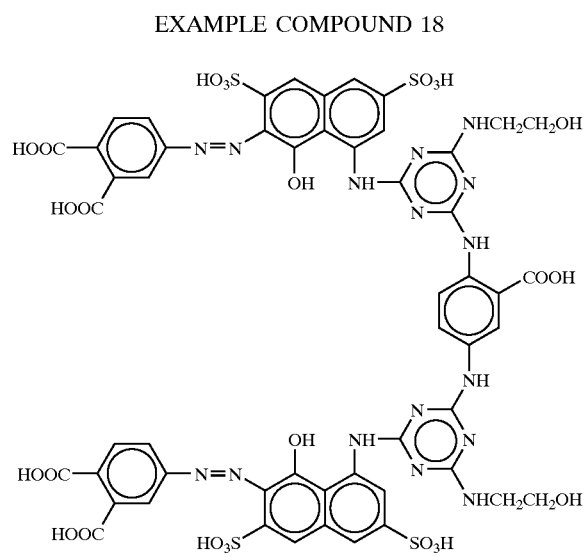
EXAMPLE COMPOUND 19
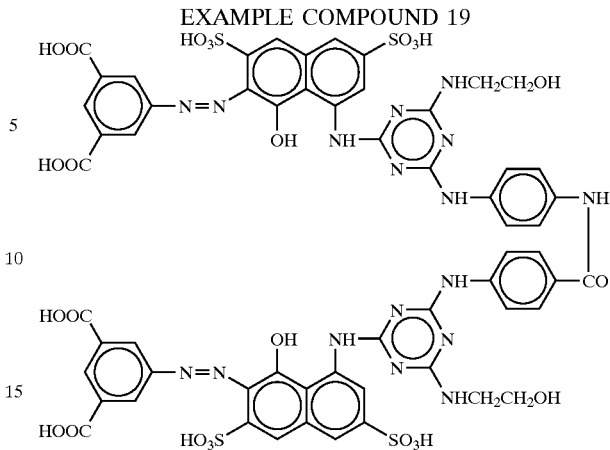
EXAMPLE COMPOUND 20
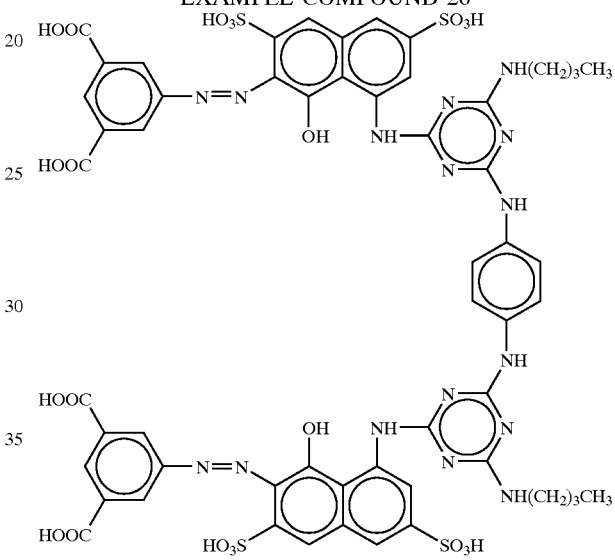
EXAMPLE COMPOUND 21
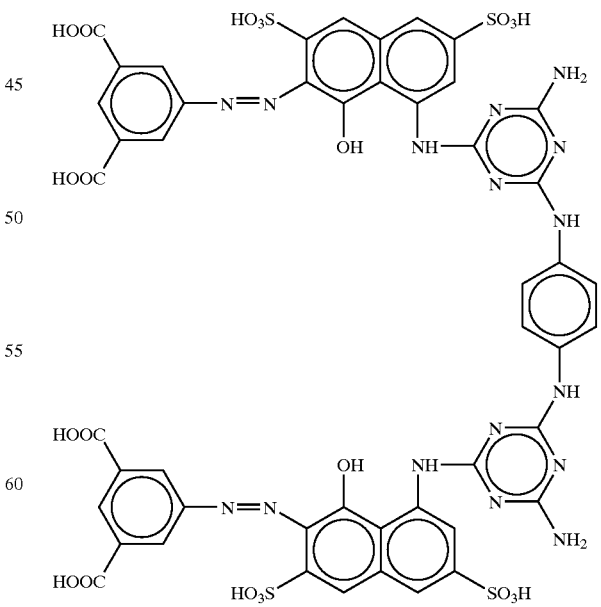

EXAMPLE COMPOUND 22
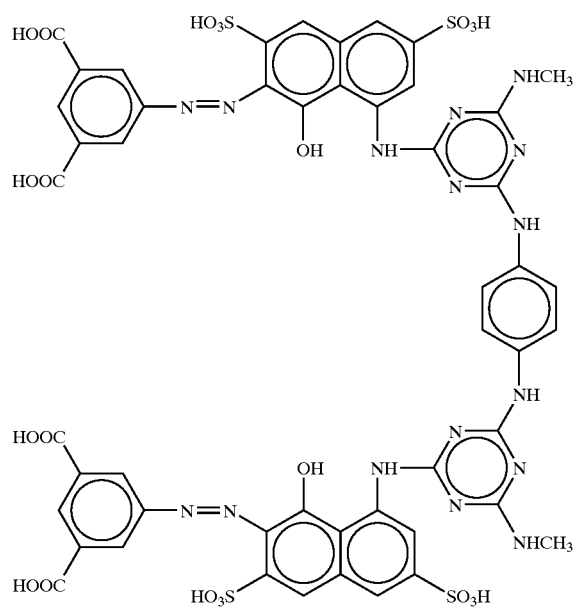
EXAMPLE COMPOUND 23
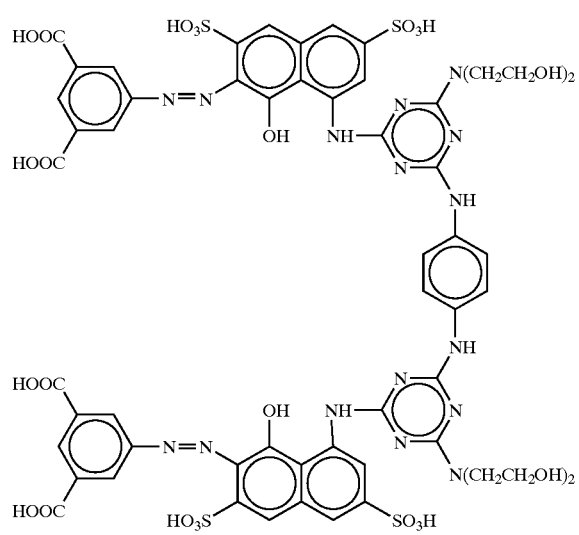
EXAMPLE COMPOUND 24
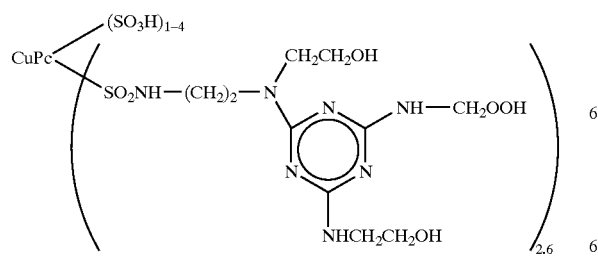
EXAMPLE COMPOUND 25
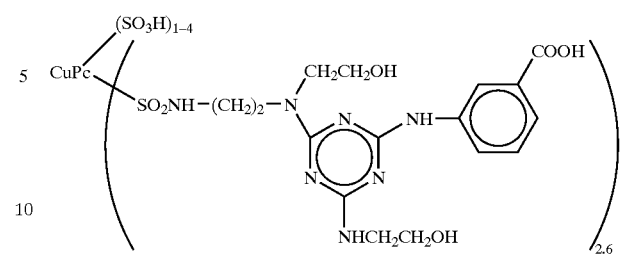
EXAMPLE COMPOUND 26
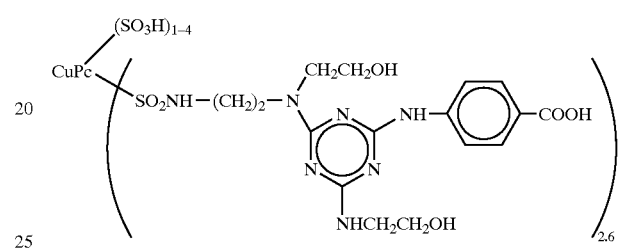
EXAMPLE COMPOUND 27
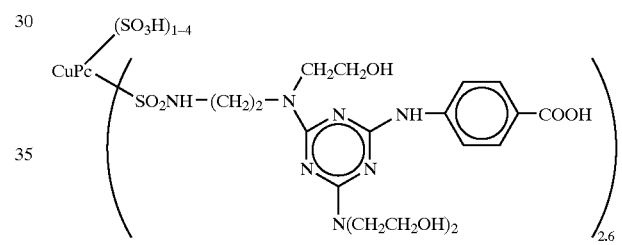
EXAMPLE COMPOUND 28
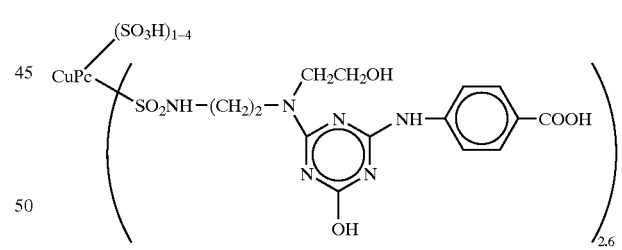
EXAMPLE COMPOUND 29
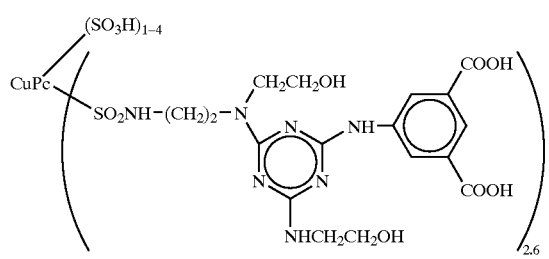

EXAMPLE COMPOUND 30

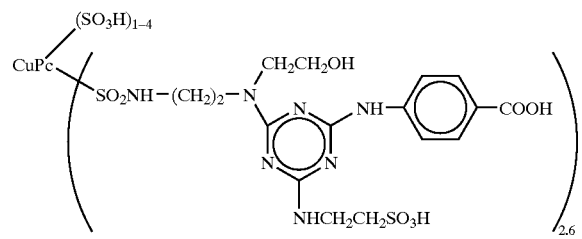

These Example Compounds may be used alone, or at least two of these may be used in combination, as the color material included in the color ink according to the present embodiment. The concentrations of these dyes and pigments are, usually, appropriately specified in the range of 0.1% to 20% by mass based on the total amount of the ink.

Next, the liquid composition according to the present embodiment, and the liquid medium used for the color ink used in the present embodiment will be explained. As the liquid medium, it is preferable to concurrently use water and a water-soluble organic solvent. Regarding the water used in the present embodiment, it is preferable to use deionized water rather than common water including various ions. The content of the water is preferably within the range of 35% to 96% by mass based on the total amount of the ink.

Since the water-soluble organic solvent can control the viscosity of the ink at a preferable viscosity suitable for use, it is used for various purposes, such as, for example, for reducing a drying speed of the ink, for preventing clogs of the nozzle of the recording head by increasing the solubility of the coloring material, etc. Suitable water-soluble organic solvents include, for example, alkyl alcohols having 1 to 5 carbons, e.g., methyl alcohol, ethyl alcohol, n-propyl alcohol, isopropyl alcohol, n-butyl alcohol, sec-butyl alcohol, tert-butyl alcohol, isobutyl alcohol, and n-pentanol, amides, e.g., dimethylformamide and dimethylacetamide, ketones or keto-alcohols, e.g., acetone and diacetone alcohol, ethers, e.g., tetrahydrofuran and dioxane, oxyethylene or oxypropylene copolymers, e.g., diethylene glycol, triethylene glycol, tetraethylene glycol, dipropylene glycol, tripropylene glycol, polyethylene glycol, and polypropylene glycol, alkylene glycols in which alkylene group has 2 to 6 carbon atoms, e.g., ethylene glycol, propylene glycol, trimethylene glycol, triethylene glycol and 1,2,6-hexane triol, glycerin, trimethylolethane and trimethylolpropane, lower alkyl ethers, e g., ethylene glycol monomethyl(or ethyl) ether, diethylene glycol monomethyl(or ethyl) ether, and triethylene glycol monomethyl(or ethyl) ether, lower dialkyl ethers of polyhydric alcohol, e.g., triethylene glycol dimethyl(or ethyl) ether and tetraethylene glycol dimethyl (or ethyl) ether, alkanolamines, e.g., monoethanolamine, diethanolamine, and triethanolamine, sulfolane, N-methyl-2-pyrrolidone, 2-pyrrolidone, and 1,3-dimethyl-2-imidazolidinone. The aforementioned water-soluble organic solvent may be used alone, or may be used as a mixture.

In order to keep the pH of the color ink according to the present embodiment constant so as to stabilize the solubility of the dye and the dispersibility of the pigment in the ink, a pH regulator may be contained in the color ink. Suitable pH regulators include, for example, hydroxides, e.g., lithium hydroxide, sodium hydroxide, potassium hydroxide, and ammonium hydroxide, sulfates, e.g., lithium sulfate, sodium sulfate, potassium sulfate, and ammonium sulfate, carbonates, e.g., lithium carbonate, sodium carbonate, sodium hydrogencarbonate, potassium carbonate, potassium hydrogencarbonate, ammonium carbonate, and ammonium hydrogencarbonate, phosphates, e.g., lithium phosphate, sodium phosphate, disodium phosphate, trisodium phosphate, potassium phosphate, dipotassium phosphate, tripotassium phosphate, ammonium phosphate, diammonium phosphate, triammonium phosphate, acetates, e.g., lithium acetate, sodium acetate, potassium acetate, and ammonium acetate, and hydrochloride.

These pH regulators maybe added into the liquid composition and the color ink alone, although it is more preferable to concurrently use at least two pH regulators selected from the aforesaid group. In order to keep the pH stable, to increase dissolution stability of the water-soluble dye included in, the color ink, and to prevent problems of clogs of the nozzle, etc., these pH regulators are added preferably by 0.1% to 10% by weight, and more preferably, by 1% to 8% by weight.

Furthermore, in the liquid composition according to the present embodiment and the color ink used together therewith, in addition to the aforementioned components, if necessary, various publicly known and common additives, for example, viscosity regulators, fungicides, preservatives, antioxidants, antifoamers, and urea and other inhibitors of nozzle from drying, can be appropriately used concurrently.

Regarding the preferable range of properties of the liquid composition according to the present embodiment and the color ink used together therewith, the pH in the neighborhood of 25° C. is preferably 3 to 12, and more preferably, is 4 to 10. The surface tension is preferably 10 to 60 mN/m (dyn/cm), and more preferably, is 15 to 50 mN/m (dyn/cm). The viscosity is preferably 1 to 30 cps, and more preferably, is 1 to 10 cps.

Regarding the ink-jet recording method according to the present embodiment, the liquid composition having the aforementioned configuration and the color ink are concurrently used, and these are applied on a recording medium while contact and reaction occur therebetween, so as to perform the recording. The recording medium used at that time is not specifically limited. However, the ink-jet recording method according to the present embodiment is especially suitable for conventionally used so-called plain papers, such as copying papers and bond papers, because reducing effect on bleeding is remarkably exhibited when images are formed on these papers.

The ink-jet recording method according to the present embodiment is a method in which the ink is ejected by applying energy for ejection to the ink so as to record the image on the recording medium. In particular, regarding the ink-jet recording method in which thermal energy is used for ejecting the ink, when the image is formed using the recording method according to the present embodiment, superior prevention of so-called kogation can be achieved. As the ink-jet recording method using thermal energy, for example, so-called on-demand type bubble-jet method, in which liquid droplets are ejected using bubble generated by thermal energy, may also be used.

In the ink-jet recording method according to the present embodiment, regarding the order of application of the liquid composition and the color ink on the recording medium in forming the image, the liquid composition may be ahead of the color ink, or the color ink may be ahead of the liquid composition, as long as the liquid composition having the aforementioned configuration and the color ink are concurrently used, and these are applied on a recording medium while contact and reaction occur therebetween, so as to perform the recording. That is, in the present embodiment, regardless of the order and method of application thereof, by applying the liquid composition on the recording medium, while being contacted with the color ink, excellent print quality and improved: fixation; water resistance; and prevention of bleeding of the image formed by the color ink are achieved. It is believed that the reason for these results include, inter alia, that the polyvalent metal ions in the liquid composition and pigments and dyes in the color ink are mixed on the recording medium so as to cause coagulation, precipitation, or increase in viscosity of the color ink.

In particular, from the viewpoint of further improvement of image density and fixation property, for example, it is more preferable to apply the liquid composition after application of the color ink, and subsequently, to further apply the color ink. The color ink may be applied on the recording medium after application of the liquid composition, and subsequently, the liquid composition may be further applied.

Figure 16:
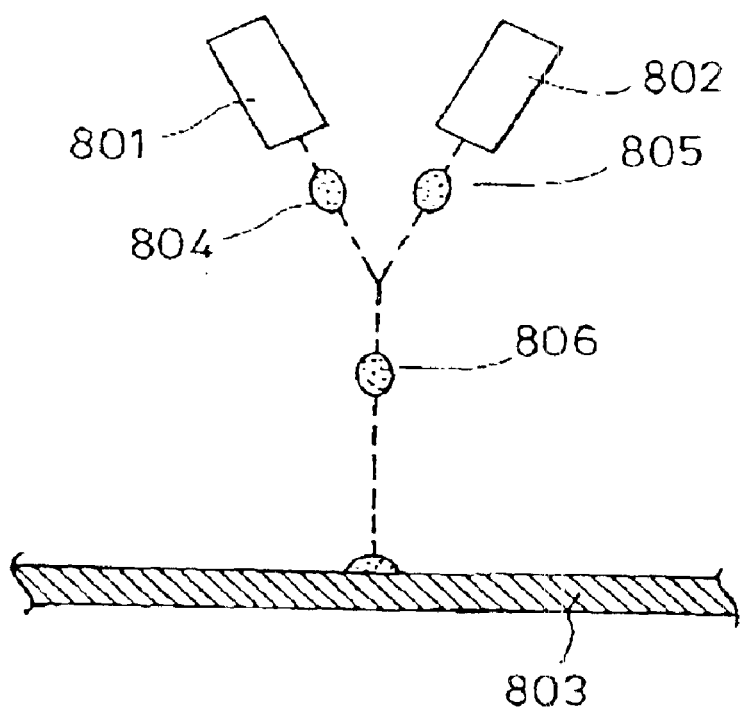
FIG. 16 is a schematic diagram of an ink-jet recording method according to an embodiment of the present invention.

In the case where the application of the liquid composition is ahead of the application of the color ink, the time interval between the adhesion of the liquid composition on the recording medium and the adhesion of the color ink is not specifically limited, although, in order to make the present invention further effective, it is preferably within a few seconds, and more preferably, is within one second. This may also be applied to the case where the application of the liquid composition and the application of the color ink are performed on the recording medium in reverse order. Furthermore, as shown in FIG. 16, each of the liquid composition 804 and the color ink 805 may be ejected from respective recording heads 801 and 802 of the ink-jet recording apparatus, and immediately after the ejection, these may be mixed 806 and applied on the recording medium 803.

As described above, according to the ink-jet recording method of the present embodiment, regardless of the order and method of the application of the liquid composition and the color ink, by concurrently applying the liquid composition composed of specified components according to the present embodiment and the color ink used together therewith on a recording medium, excellent print quality, and improved fixation, water resistance of the image formed by the color ink, and prevention of bleeding during formation of the color image. It is believed that these advantages because polyvalent metal ions contained in the liquid composition and pigments, dyes, or pigments and dyes in the color ink are mixed so as to form coagulates, and as a consequence, the aforementioned superior effects are achieved.

In the ink-jet recording method according to the present embodiment, when the liquid composition and the color ink are applied on the recording medium and recording is performed by the aforementioned method, in the image formation region, the ratio of the application quantity of the color ink to that of the liquid composition per area of the recording medium may be 1:1, although the ratio of the color ink to the liquid composition may be 10:1 to 10:10. Herein, the control of the ratio of the application quantity of the color ink to that of the liquid composition per area of the recording medium can be performed by various methods including, for example, a method in which when the application of the liquid composition and the color ink on the recording medium is performed by the ink-jet recording method, the number of pixels of the liquid composition to be adhered on the recording medium is controlled in the range of 10% to 100% of the number of pixels of the color ink to be adhered on the recording medium, a method in which when the application of the liquid composition and the color ink on the recording medium are performed by the ink-jet recording method, the ejection quantity of the liquid composition is controlled to be smaller than the ejection quantity of the color ink so as to make the number of pixels of the liquid composition to be adhered on the recording medium in the range of 10% to 100% of the number of pixels of the color ink to be adhered on the recording medium, or a method which is combination of the aforementioned methods.

The ink-jet recording method according to the present embodiment and the ink-jet recording apparatus applying this method will be explained below in further detail. In the ink-jet recording method according to the present embodiment, the ink-jet recording method, in which energy is applied to the ink, and the ink is thereby ejected so as to form the image on the recording medium, is used as the method for adhering the liquid composition according to the present embodiment and the color ink on the recording medium. As the recording method, various publicly known conventional ink-jet methods such as, for example, an ink-jet recording method using mechanical energy due to deformation of a piezoelectric element, can be used. However, it is preferable to use an ink-jet recording method in which ink is ejected by the application of thermal energy.

That is, as described above, the occurrence of kogation caused when the image is formed by the ink-jet recording method, in which, in order to prevent color mixed bleeding between different colors and to improve water resistance of records, the color ink and the liquid composition containing polyvalent metal salts are used concurrently, and thermal energy is used to eject the liquid composition, and degradation of image quality accompanying this, can be effectively prevented by the ink-jet recording method according to the present embodiment in which the liquid composition according to the present embodiment is used. In contrast, in a conventional method, when the solution used together with the color ink in order to prevent bleeding and to improve water resistance of records was repeatedly ejected from the recording head, sometimes, the outermost surface protection layer made of at least one of metal or metal oxide, for example, made of at least one of tantalum or tantalum oxide, formed on the heater (heater element substrate) for applying thermal energy was dissolved, and accompanying this, breaks in the heater occurred so that ejection became impossible, and kogation occurred on the heater so as to affect quality of the formed image. However, these problems are effectively prevented by the present invention.

The ink-jet recording apparatus according to the present embodiment using the liquid composition according to the present embodiment includes a liquid composition storage portion storing the liquid composition, a color ink storage portion storing the color ink, and an ink-jet recording head that ejects each of the liquid composition and the color ink. As described above, a preferable embodiment is an apparatus which ejects the liquid composition and the color ink by function of thermal energy, and which is an ink-jet recording apparatus provided with a head for ink-jet recording including a heater in order to apply thermal energy to the liquid composition and the color ink in the flow path introduced from the aforementioned liquid composition storage portion and color ink storage portion and a device for applying an electrical pulse signal to the aforementioned heater responding to recording information, and furthermore, which is an ink-jet recording apparatus wherein the aforementioned heater has an outermost surface protection layer containing at least one of a metal and a metal oxide. In particular, when the metal and the metal oxide are tantalum and tantalum oxide in an embodiment of the ink-jet recording apparatus, the effects of the present invention are remarkably exhibited.

Furthermore, it has been observed that when the ink-jet recording apparatus is controlled so that the ratio of an energy $E_{op}$, which is input into the heater in order to eject the liquid composition, to the minimum energy input $E_{th}$, which is necessary for the heater to eject the ink from a recording head, $E_{op}/E_{th}$ (=r value), satisfies the relationship, $1.10 \leq E_{op}/E_{th} \leq 1.90$, the effects of the present invention are remarkably exhibited.

Figure 2:
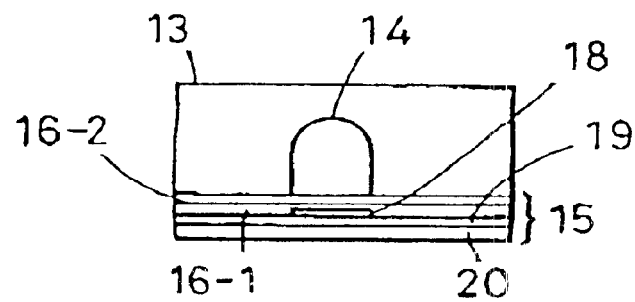
FIG. 2 is a horizontal sectional view of an embodiment of a recording head of an ink-jet recording apparatus according to the present invention.

The ink-jet recording apparatus by application of the ink-jet recording method, in which the ink is ejected using thermal energy, will be explained below with reference to the drawings. FIG. 1 and FIG. 2 show an embodiment of a recording head that is a part of an ink-jet recording apparatus using thermal energy. FIG. 1 is a sectional view of a recording head 13 along an ink flow path. FIG. 2 is a sectional view of the section indicated by line II—II shown in FIG. 1. The head 13 is produced by adhering a glass, ceramic, silicon, polysulfone, or plastic board, etc., having a flow path (nozzle) 14 for ink and a heater element substrate 15. The heater element substrate 15 is composed of: (1) a protection layer 16-1 made of silicon oxide, silicon nitride, silicon carbide, etc.; (2) an outermost surface protection layer 16-2 made of metal, such as, for example, platinum, or a metal oxide, such as, for example, platinum oxide, especially, made of tantalum or tantalum oxide; (3) electrodes 17-1 and 17-2 made of, for example, aluminum, gold, aluminum-copper alloys, etc.; (4) a heating resistor layer 18 made of a high melting point material, such as, for example, hafnium boride, tantalum nitride, tantalum-aluminum, etc.; (5) a heat storage layer 19 made of, for example, silicon oxide, aluminum oxide, etc.; (6) and a substrate 20 made of a heat-dissipating material, such as, for example, silicon, aluminum, or aluminum nitride.

Figure 3:
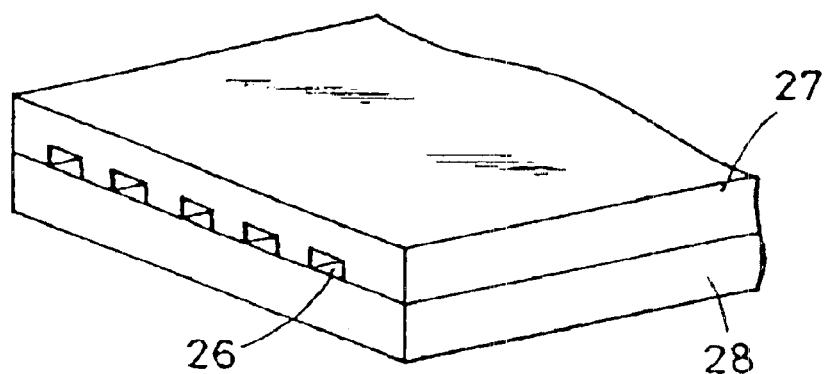
FIG. 3 is an external perspective view of a head in which the recording head according to the present invention as shown in FIG. 1 is multiplied.

In the ink-jet recording apparatus using thermal energy, when an electrical pulse signal is applied to the electrodes 17-1 and 17-2 of the aforementioned head 13, a region of the heater element substrate 15 (heater) indicated by n is rapidly heated, and a bubble is generated in the ink 21 contacting with this surface. Subsequently, a meniscus 23 is extruded due to the pressure thereof, and the ink 21 is ejected through a nozzle 14 of the head, and travels as ink droplets 24 from an ejection orifice 22 toward a recording medium 25. FIG. 3 is an external perspective view of an embodiment of a multihead in which multiple recording heads, like the one shown in FIG. 1, are arranged. This multihead is produced by adhering a glass board 27 having a multinozzle 26 and a heater head 28 similar to that explained in FIG. 1.

Quantity of Energy Applied to Heater

Next, the r value will be explained. The r value is a factor representing a ratio of actually input energy to the critical energy which is minimum energy required of the bubble-jet head for ejecting the ink or the liquid composition. That is, input energy E is represented by the following formula (A) using a width P of a pulse applied to the bubble-jet head (when a plurality of divided pulses are applied, total width is used), applied voltage V, and resistance R of the heater, $$E = P \times V^2/R \tag{A}$$

At this time, the r value is determined by the following formula (B) from the minimum energy $E_{th}$, which is necessary for the heater to eject the ink or the liquid composition from the bubble-jet head, and the energy $E_{op}$, which is actually input in order to drive, $$r = E_{op}/E_{th} \tag{B}$$

As the method for determining the r value suitable for, for example, ejecting the liquid composition based on the driving conditions of the bubble-jet head, the following two methods (1) and (2) are performed in practice.

(1) When Pulse Width is Fixed

A voltage suitable for ejecting the liquid composition from the bubble-jet head is determined using the specified pulse width, and ink ejection is started by driving the heater. Then, the voltage is gradually reduced to find the voltage at which the ejection stops, and the voltage immediately before the voltage at which ejection stops is assumed to be the minimum voltage $V_{th}$ at which ejection is possible. When the voltage actually used for driving is indicated by $V_{op}$, the r value is determined by the following formula (C), $$r = (V_{op}/V_{th})^2 \tag{C}$$

(2) When Voltage is Fixed

A pulse width suitable for ejecting the liquid composition from the bubble-jet head is determined using the specified voltage, and ink ejection as started by driving heater. Then, the pulse width is gradually reduced to find the pulse width at which the ejection stops. The pulse width immediately before the pulse width at which ejection stops is assumed to be the minimum pulse width $P_{th}$ at which ejection is possible. When the pulse width actually used for driving is indicated by $P_{op}$, the r value is determined by the following formula (D), $$r = P_{op}/P_{th} \tag{D}$$

Herein, the voltage is a voltage actually applied to the heater portion in order to heat the bubble-jet heater. Since the voltage applied from the outside of the head may be reduced due to contact and wiring resistance, etc., it cannot be used for calculating the r value in the strict sense. However, when $V_{th}$ and $V_{op}$ are measured from the outside of the head, since both measured values include the aforementioned voltage variation, even if these values are directly used for calculating the r value, error is small, as long as the voltage variation is not large. Therefore, these values can be used as the r value for convenience sake.

When recording is performed using a practical printer, since a plurality of heaters are driven, it must be noted that a voltage applied to one heater may vary as a result of variations between the individual heads.

From the aforementioned formulae (A) and (B), when the r value is the same, the square of V and P seem to be in inverse proportion, although, in practice, since there are electrical problems in that a pulse shape does not become rectangular, etc., thermal problems in that when pulse shapes are different, thermal diffusions in the periphery of heaters are different, etc., and problems specific to bubble-jet in that when voltages are different, heat fluxes from heaters to inks are different so as to cause variation in the states of bubbling, etc., the square of V and P are not in a simple relationship. Therefore, the methods described in the aforementioned (1) and (2) must be treated independently. It must be noted that conversion of one value to another value by calculation may cause an error. In the present invention, the r value was determined by the aforementioned method (1), unless otherwise specified.

In order to stably eject the ink and the liquid composition, it is general to drive under conditions where the r value determined as described above is in the range of about 1.12 to 1.96. However, in the case where the liquid composition according to this embodiment of the present embodiment is ejected from the recording head due to application of thermal energy, by driving while the r value is in a predetermined range, specifically, in the range of 1.10 to 1.90, adhesion of kogation due to the ejection of the liquid composition to the heater is further prevented, and consequently, the life span of recording head can be further extended, so that this case is preferable.

Although the specific reasons adhesion of kogation to the heater can be especially effectively prevented, and consequently, the life span of recording head can be further increased when the liquid composition according to the present embodiment is elected from the recording head due to application of thermal energy, while the r value is in the aforementioned range, are not certain, it is believed that, by driving while the r value is in the aforementioned range, first, at least one of acids including amino groups and salts thereof contained in the liquid composition according to the present embodiment protects the outermost surface protection layer with a result that-erosion of at least one of metals and metal oxides thereof constituting the outermost surface protection layer is effectively prevented, and second, since the surface temperature of the heater is not excessively increased due to excessive supply of energy to the heater, erosion (dissolution) of metal due to increased alkalinity caused by polyvalent metal ions constituting the liquid composition used in order to prevent occurrence of color mixed bleeding and to improve water resistance of records does not excessively occur.

Figure 4:
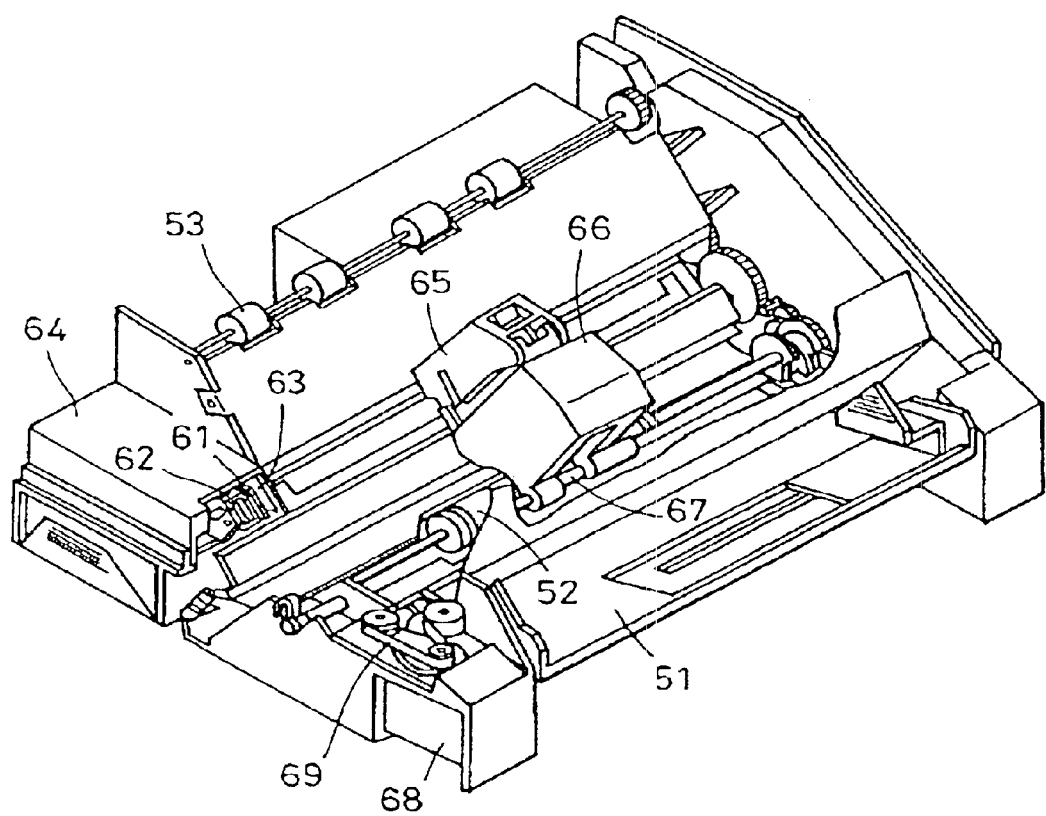
FIG. 4 is a schematic perspective view of an embodiment of an ink-jet recording apparatus according to the present invention.

FIG. 4 shows an embodiment of an ink-jet recording apparatus in which the recording head as explained above is incorporated. In FIG. 4, an end of a blade 61 as a wiping member is held and fixed by a blade-holding member so as to have the form of a cantilever. The blade 61 is deployed at a position adjacent to a recording region for the recording head 65, and in the embodiment as shown in the drawing, the blade 61 is held protruding into the path of the movement of the recording head 65.

A cap 62 is a cap of an ejection outlet face of the recording head 65, and is deployed at the home position adjacent to the blade 61. The cap 62 moves in the direction perpendicular to the direction of the movement of the recording head 65 and contacts the ejection outlet face so as to perform capping. Ink absorbent 63 as shown in FIG. 4 is deployed adjacent to the blade 61, and is held protruding into the path of the movement of the recording head 65 in a manner similar to that of the blade 61.

An ejection recovery portion 64 is composed of the aforementioned blade 61, cap 62, and ink absorbent 63, and water, dust, and the like on the ink ejection outlet face are removed by the blade 61 and the ink absorbent 63.

The recording head 65 has an ejection energy generation device and ejects the ink toward the recording medium facing an ejection outlet face provided with an ejection outlet so as to perform the recording. A carriage 66 has a recording head 65 mounted on it so as to carry the recording head 65. The carriage 66 slidably engages a guide shaft 67, and a part of the carriage 66 connects with a belt 69 driven with a motor 68, although not shown in the drawing. Accompanying this, the carriage 66 can move along the guide shaft 67, and therefore, the recording head 65 can move to the recording region and the region adjacent thereto.

A feeder 51 inserts the recording material. A feed roller 52 is driven by a motor, which is not shown in the drawing. According to this configuration, the recording medium is fed to a position facing the ejection outlet face of the recording head 65, and is discharged to a discharge portion provided with a discharge roller 53 during the recording. Regarding the aforementioned configuration, when the recording head 65 returns to the home position in accordance with the completion of the recording, the blade 61 protrudes into the path of the movement of the recording head 65, while the cap 62 in the head recovery portion 64 recedes from the path of the movement. As a consequence, the ejection outlet face of the recording head 65 is wiped.

When the cap 62 contacts the ejection outlet face of the recording head 65 in order to perform capping, the cap 62 moves so as to protrude into the path of the movement of the recording head 65. When the recording head 65 moves from the home position to the recording start position, the cap 62 and the blade 61 are located at the same position as that in the aforementioned wiping. As a consequence, the ejection outlet face of the recording head 65 is also wiped during this movement. The recording head moves to the home position at the time of the completion of the recording and the ejection recovery. In addition to this, when the recording head moves between recording regions for recording, the recording head moves to the home position adjacent to the recording region at predetermined intervals so that the aforementioned wiping is also performed accompanying this movement.

Figure 5:
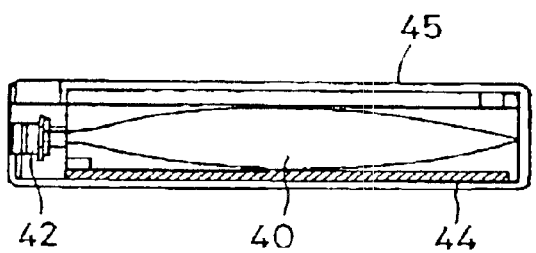
FIG. 5 is a perspective view of the internal configuration of an embodiment of an ink cartridge.

FIG. 5 shows an embodiment of an ink cartridge 45 storing the ink to be supplied to the recording head through an ink supply member, such as, for example, a tube. Herein, the ink storage portion 40 storing the supply of ink may be, for example, an ink bag having a rubber stopper 42 at the end. The ink in the ink bag 40 can be fed to the head by a needle, (not shown in the drawing), inserted into the stopper 42. Ink absorbent 44 receives the waste ink. The face of the ink storage portion contacting the liquid is preferably made of polyolefin, and more preferably polyethylene.

Figure 6:
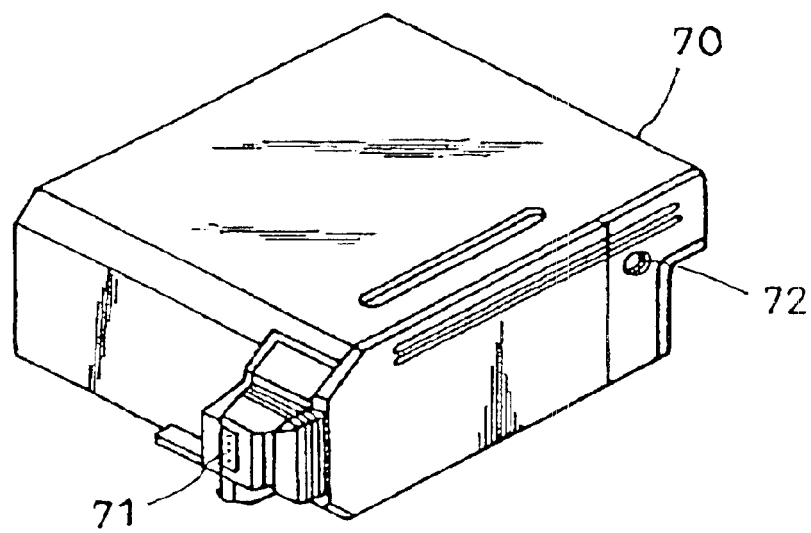
FIG. 6 is a perspective view of an embodiment of a recording unit.

The ink-jet recording apparatus according to the present embodiment is not limited to the aforementioned ink-jet recording apparatus in which the head and the ink cartridge are separated, and may be an ink-jet recording apparatus in which the head and the ink cartridge are integrated as shown in FIG. 6. In FIG. 6, an ink storage portion storing the ink, for example, an ink absorbent, is stored in a recording unit 70, and the ink in the ink absorbent is ejected as ink droplets from a head portion 71 including a plurality of orifices. A preferable material for use as the ink absorbent is, polyurethane. A configuration in which the ink storage portion is an ink bag provided with a spring therein instead of the ink absorbent may be adopted. The inside of the cartridge is communicated with air through a ventilation hole 72. This recording unit 70 is used instead of the recording head 65 as shown in FIG. 4, and can be freely attached to or detached from the carriage 66.

Figure 7:
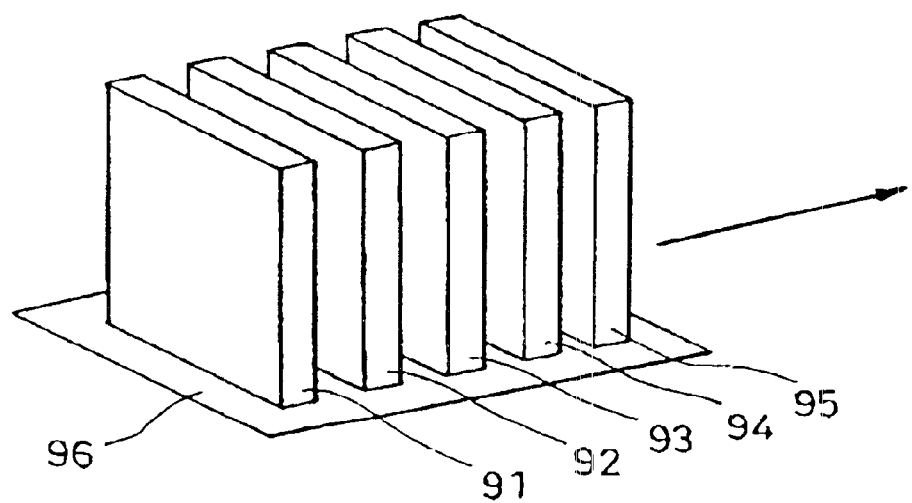
FIG. 7 is a perspective view of a recording portion in which a plurality of recording heads are arranged.

When a color image is formed by the ink-jet recording method according to the present embodiment, for example, a recording apparatus in which five recording heads as shown in FIG. 3 are arranged on a carriage is used. FIG. 7 shows such an embodiment. Recording heads 91, 92, 93, and 94 eject yellow ink, magenta ink, cyan ink, and black ink, respectively. A head 95 ejects the liquid composition. These heads are deployed in the aforementioned recording apparatus, and eject each of inks responding to recording signals. The liquid composition is, for example, adhered to at least the image formation part of the recording medium on which the inks are adhered prior to the ejection of each of color inks.

Figure 8:
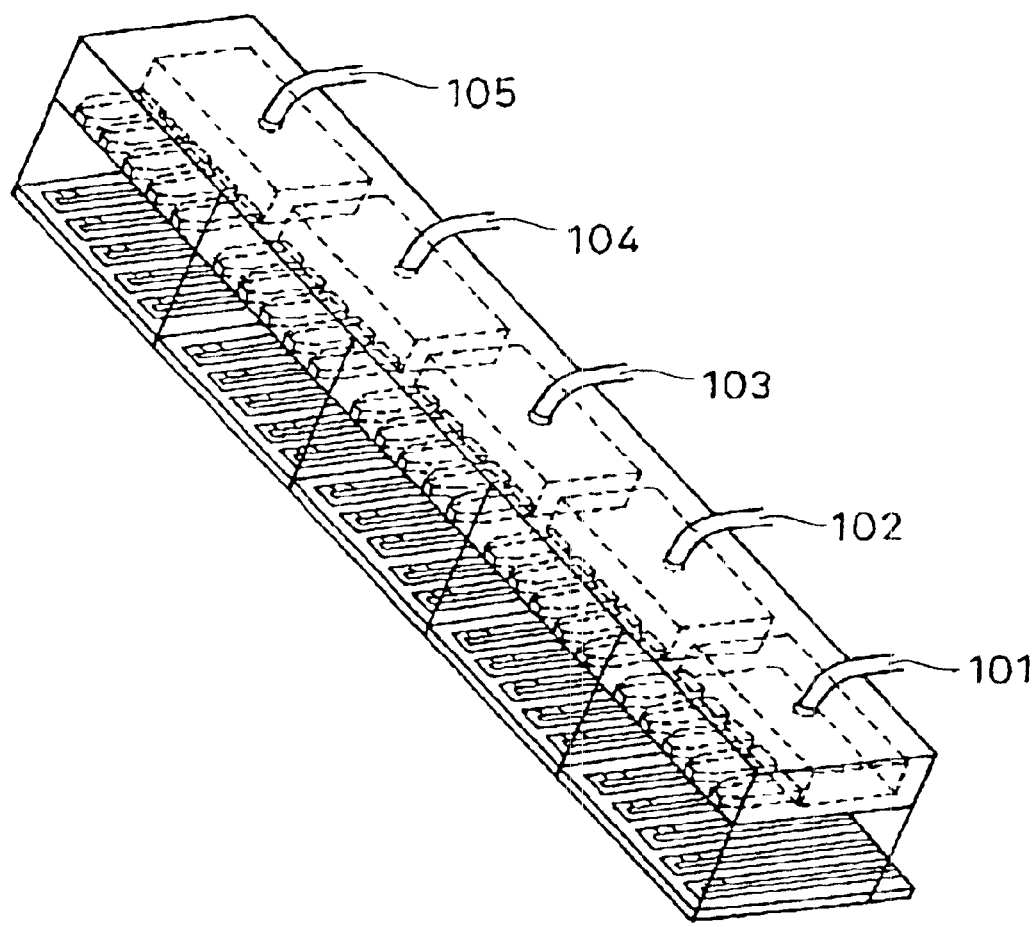
FIG. 8 is a perspective view of another recording head used for the present invention.

FIG. 7 shows an embodiment using five recording heads, although it is important to note that the present invention is not limited to this, and, as shown in FIG. 8, it is also preferable to eject yellow 101, magenta 102, cyan 103, black 104, and liquid composition 105 from one recording head by separating liquid flow paths. The heads may be arranged so that the recording order of each ink and the liquid composition becomes the reverse of the aforementioned order.

Figure 9:
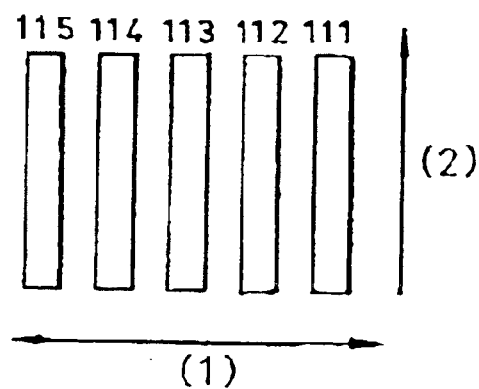
FIG. 9 is a diagram of a first configuration of a recording head.
Figure 10:
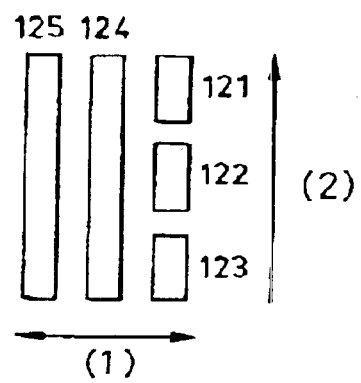
FIG. 10 is a diagram of a second configuration of a recording head.
Figure 11:
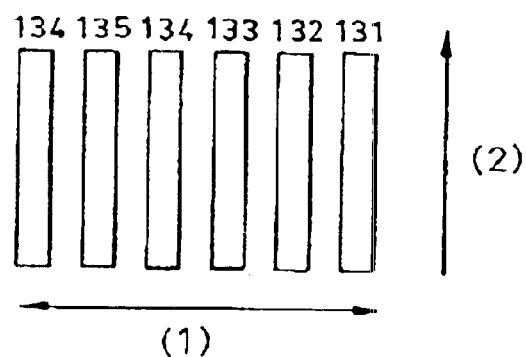
FIG. 11 is a diagram of a third configuration of a recording head.

As examples of specific arrangements of the ink-jet recording head appropriately used in the present embodiment, three configurations are-shown in FIGS. 9, 10, and 11. In FIGS. 9, 10, and 11, reference numerals 111 to 114, 121 to 124, and 131 to 134 each indicates recording heads for ejecting coloring inks of yellow (Y), magenta (M), cyan (C) and black (Bk), respectively. Reference numerals 115, 125 and 135 designate recording heads for ejecting a liquid composition (S). Each of the recording heads is arranged on the carriage in a general manner similar to that as shown in FIG. 7, although the arrangements are different depending on configurations. Each of the recording heads is deployed in the aforementioned recording apparatus, and ejects each of the color inks responding to the recording signal. The liquid composition is adhered to at least the image formation part of the recording medium, on which the color inks are adhered, prior to, or after, the ejection of the color inks. Each of the recording heads moves with the carriage in the direction indicated by an arrow (1), and the recording medium moves with feed roller, etc., in the direction indicated by an arrow (2).

In a first configuration example, as shown in FIG. 9, recording heads S(115), Bk(114), C(113), M(112) and Y(111) are arranged on the carriage in parallel. In a second configuration example, as shown in FIG. 10, the recording heads for the liquid composition(125) and the black ink(124) are arranged in parallel, and recording heads C(123), M(122), and Y(121) are arranged in series with each other, and in parallel to the aforementioned recording heads. Herein, the ejection volume of each of the recording heads per 1 dot is not necessarily the same. The ejection volume (Vd) of each of the recording heads per 1 dot may be controlled depending on a composition of the liquid composition, etc., so that optimized recording is performed. Preferably, the recording heads S, Y, M, and C have the same Vd, and the Vd of the recording head is specified to be twice larger than that, although not limited to this. In a third configuration example, as shown in FIG. 11, recording heads Bk(134), S(135), Bk(134), C(133), M(132), and Y(131), each having the same ejection volume, are arranged in parallel on a carriage, and therefore, the ejection quantity of the black ink can be twice as much as the ejection quantity of the liquid composition and each of the color inks. In the configuration example shown in FIG. 11, the ejection volume (Vd) of each of the recording head S, Bk, Y, M, and C is not necessarily the same.

As described above, in the present embodiment, the ratio of the application quantity of the color ink, especially magenta ink, to that of the liquid composition per area of the recording medium may be 1:1 in the image formation region, although the ratio of the color ink to the liquid composition may range between 10:1 to 10:10. Herein, the control of the ratio of the application quantity of the color ink to that of the liquid composition per area of the recording medium can be performed by, specifically, for example, a method in which the number of pixels of the liquid composition to be adhered on the recording medium is controlled in the range of 10% to 100% of the number of pixels of the color ink to be adhered on the recording medium, a method in which, regarding the application of the liquid composition and the color ink, the ejection quantity of the liquid composition is controlled to be smaller than the ejection quantity of the color ink, or a method in which the aforementioned methods are combined, so that the number of pixels of the liquid composition to be adhered on the recording medium is controlled to be in the range of 10% to 100% of the number of pixels of the color ink to be adhered on the recording medium, and the ejection quantity of the liquid composition is controlled to be smaller than the ejection quantity of the color ink in the application of the liquid composition and the color ink on the recording medium.

Second Embodiment

As a second embodiment according to the present invention, an ink including a coloring material, a liquid medium, a polyvalent metal salt, and a material selected from the group consisting of acids including amino groups and salts thereof will be explained. In the preferable embodiment using the aforementioned ink, the ink is color ink, and the ink set for ink-jet recording is composed of this color ink and black ink which includes a coloring material and a liquid medium, and reacts with the color ink on contact therewith. An embodiment using the aforementioned ink set will be explained below In the present embodiment, recording is performed by application of the color ink and the black ink, while a contact state of the color ink and the black ink is formed on the recording medium. It is an object of the ink set according to the present embodiment to alleviate bleeding between the black ink and the color ink. Regarding alleviation of bleeding among the color inks, for example, yellow ink, magenta ink, and cyan ink, no specific measure is taken, although the present invention is also effective on prevention of bleeding among the color inks to perform ink design by, for example, adding a surfactant into the color ink, in order to make the color ink rapidly penetrate plain paper.

The color ink constituting the ink set according to the present embodiment will be explained. The color Ink used in the present embodiment includes a coloring material, a liquid medium, a polyvalent metal salt, and a material selected from the group consisting of acids including amino groups and salts thereof as described in detail in the aforementioned first embodiment.

The coloring material included in the color ink constituting the ink set according to the present embodiment will be explained. As the coloring material, direct dyes, acidic dyes, basic dyes, dispersion dyes, and pigments are mentioned, and it is preferable that even when the coloring material is blended with the polyvalent metal salt, it does not react and solubility is maintained. Suitable coloring materials include, for example, C.I. Acid Yellow 23, C.I. Acid Red 52 and 289, C.I. Acid Blue 9, C.I. Reactive Red 180, C.I. Direct Blue 189 and 199, C.I. Basic Yellow 1, 2, 11, 13, 14, 19, 21, 25, 32, 33, 36, and 51, C.I. Basic orange 2, 15, 21, and 22, C.I. Basic Red 1, 2, 9, 12, 13, 37, 38, 39, and 92, C.I. Basic Violet 1, 3, 7, 10, and 14, C.I. Basic Blue 1, 3, 5, 7, 9, 19, 24, 25, 26, 28, 29, 45, 54, and 65, C.I. Basic Green 1 and 4, C.I. Basic Brown 1 and 12, and C.I. Basic Black 2 and 8, etc. These water-soluble dyes may be used alone, and at least two dyes may be used in combination. The concentrations of these water-soluble dyes are preferably within the range of 0.1% to 20% by mass relative to the total quantity of the ink.

In the color ink constituting the ink set for ink-let recording according to the present invention, in addition to the aforementioned components, preferably, at least one surfactant is included. By including the surfactant, the color ink can be invested with a desired penetration property and viscosity. That is, as described above, it is an object of the ink set for ink-jet recording according to the present invention to prevent bleeding between the black ink and the color ink. Regarding prevention of bleeding among the color inks, for example, yellow ink, magenta ink, and cyan ink, non-specific measure is taken. However, as described above, it is preferable to design the addition of the surfactant into the color ink, in order to make the color ink have rapid penetration property respect to sized plain paper, because degradation of print quality is not brought out by a large degree in practice.

Various publicly known conventional surfactants, such as, for example, anionic surfactants, cationic surfactants, and nonionic surfactants, may be used. Among these, nonionic surfactants are preferable. The quantities of these surfactants added into the color ink are not specifically limited, although in order to achieve a desired penetration property and an appropriate viscosity, it is preferably within the range of 0.01% to 10% by mass based on the total amount of the ink, and, more preferably, is within the range of 0.1% to 10%.

The black ink constituting the ink set for ink-jet recording according to the present embodiment will be explained. The black ink used in the present embodiment includes a coloring material, which reacts with the polyvalent metal, and a liquid medium. As the coloring material used in the black ink, black coloring materials usable for the color ink in the aforementioned fist embodiment can be used. These coloring materials may be used alone, or at least two of these may be used in combination. The quantities of these coloring materials added to the ink are preferably within the range of 0.1% to 20% by mass based on the total amount of the ink.

In the present embodiment, preferably, a nonionic surfactant is further included in the black ink. Accompanying this, bleeding between the black ink and the color ink can be further prevented. Furthermore, by the addition of the nonionic surfactant, as described below, an effect of preventing reduction of the black ink density at the boundary between the black ink and the color ink, that is, occurrence of so-called white haze, can also be achieved.

In the color ink used for the ink set for ink-jet recording according to the present embodiment, as described above, in order to improve the characteristics as the ink for ink-jet recording, preferably, a surfactant is included, and many color inks have high penetration property into recording media, such as plain paper, and have low surface tensions. When the aforementioned color ink having a low surface tension and the black ink, used in the present invention, having a high surface tension are adjacent to each other, a region, in which there are few coloring materials, may be generated at a boundary adjacent to the black ink. AS a consequence, a phenomenon called white haze may occur. Therefore, by adding the nonionic surfactant to the black ink so as to reduce the surface tension, the aforementioned white haze phenomenon can be prevented from occurring.

In the present embodiment, the content of the nonionic surfactant included in the black ink is not specifically limited as long as bleeding and white haze are prevented, although in order to further prevent bleeding between the black ink and the color ink, to effectively prevent the occurrence of white haze, and to keep ink ejection property and print quality excellent, the content is preferably within the range of 0.1% to 0.5% by mass based on the total amount of the ink, and more preferably, is within the range of 0.2% to 0.4%.

Herein, as the nonionic surfactant, it is preferable to use nonionic surfactants of higher alcohol ethylene oxide adducts, such as, for example, alkylphenol ethylene oxide adducts, aliphatic ethylene oxide adducts, polyhydric alcohol aliphatic acid ester ethylene oxide adducts, aliphatic amide ethylene oxide adducts, higher alkylamine ethylene oxide adducts, polypropylene glycol ethylene oxide adducts, polyhydric alcohol aliphatic acid esters, and alkanolamine aliphatic amides. More preferably, nonionic surfactants of higher alcohol ethylene oxide adducts, alkylphenol ethylene oxide adducts, ethylene oxide-propylene oxide copolymer, acetylene glycol ethylene oxide adducts, etc., can be used. The aforementioned ethylene oxides having the adduct mole number within the range of 4 to 20 are still more preferable.

As the liquid medium used in the black ink and color ink constituting the ink set for ink-jet recording according to the present embodiment, the liquid composition in the aforementioned first embodiment, and water-soluble solvents which was explained above in detail as the liquid media included in the color ink used together with the liquid composition, as well as additives, addition quantities, property values, etc., can be used.

The ink-jet recording method according to the present embodiment, and the ink-jet recording apparatus, which can realize the recording method, will be explained.

In the ink-jet recording method according to the present embodiment, the ink is ejected due to application of energy for ejection to the ink so as to record the color image on the recording medium, and the aforementioned ink set for ink-jet recording according to the present embodiment is used for the ink.

The recording medium used in the present embodiment is not specifically limited. However, in the present invention, especially, conventionally used so-called plain papers, such as copying papers and bond papers, are preferable, because the reduced effect of bleeding is exhibited when images are formed on these types or papers using the ink set according to the present invention. The ink set for ink-jet recording according to the present invention can also be appropriately used for, for example, coated papers and OHP transparency films, which are specifically produced for ink-jet recording, and furthermore, that can also be appropriately used for common high quality papers and calendered papers.

In the ink-jet recording method according to the present embodiment, as the method for applying the black ink and the color ink on the recording medium, a method, in which the black ink and the color ink are applied so as to contact with each other at boundary, can be used.

As another embodiment, a method in which the black ink (1) and the color ink (2) are applied so as to superimpose on each other on the recording medium, and the application of the color ink on the recording medium is performed prior to the application of the black ink (hereafter called as under pick method) can be used. By performing the under pick method, the bleeding between the black ink and the color ink can be improved, and furthermore, the aforementioned white haze can be reduced. In the aforementioned under pick method, the time interval between the adhesion of the color ink on the recording medium and the adhesion of the black ink is not specifically limited, although, it is preferably within a few seconds, is more preferably within one second in order to make the present invention even more effective. In an alternate embodiment, the color ink is applied after the application of the black ink (over pick), or the color ink and the black ink are mixed immediately after ejection thereof as shown in FIG. 16.

In the under pick method, the ratio of the application quantity of the black ink (1) to that of the color ink (2) per area of the recording medium may be 1:1 in the image formation region, although the ratio of the black ink (1) to the color ink (2) may be in the range of 10:1 to 10:10. Accompanying this, the white haze in the resulting image can be reduced, and especially in a solid image, uniformity can be achieved. Herein, the control of the ratio of the application quantity of the black ink to that of the color ink per area of the recording medium in the image forming region can be performed by, specifically, for example, when the application of the black ink and the color ink on the recording medium are performed by the ink-jet recording method, a method in which the number of pixels of the color ink to be adhered on the recording medium is controlled in the range of 10% to 100% of the number of pixels of the black ink to be adhered on the recording medium, a method in which the ejection quantity of the color ink is controlled to be smaller than the ejection quantity of the black ink, or a method in which the aforementioned methods are combined, so that the number of pixels of the color ink to be adhered on the recording medium is controlled to be in the range of 10% to 100% of the number of pixels of the color ink and the black ink to be adhered on the recording medium, and at that time, the ejection quantity of the color ink is controlled to be smaller than the ejection quantity of the black ink.

As the method for adhering the black ink and the color ink constituting the ink set for ink-jet recording according to the present embodiment, the ink-jet recording method is used in the present embodiment. As the ink-jet recording method, various publicly known conventional ink-jet methods, such as, for example, an ink-jet recording method using mechanical energy due to deformation of a piezoelectric element, can be used. However, in particular, it is preferable to use an ink-jet recording method using thermal energy, because remarkable effects of the present invention can be achieved.

That is, as described above, when the color ink including the polyvalent metal salt is used in order to improve the prevention of color mixed bleeding between the black ink and the color ink, occurrence of kogation which occurs in the case where the image is formed by the ink-jet recording method using thermal energy in order to eject the color ink, and degradation of image quality accompanying this are effectively prevented by the ink-jet recording method according to the present embodiment using the ink set composed of the specified black ink (1) according to the present embodiment and the color ink (2). In conventional methods, when the color ink containing a polyvalent metal salt in order to prevent bleeding was repeatedly ejected from a recording head, sometimes, the outermost surface protection layer made of at least one of metals and metal oxides, such as tantalum and tantalum oxide, formed on a heater (heater element substrate), which applies thermal energy, is dissolved, and as a result, breaks in the heater occurred so as to cause a problem of incapability of ejection, and kogation was formed on a heater so as to cause a problem in that the image quality was affected. However, these problems are remedied by the present invention.

The ink-jet recording apparatus using thermal energy is as described in detail in the aforementioned first embodiment.

Figure 12:
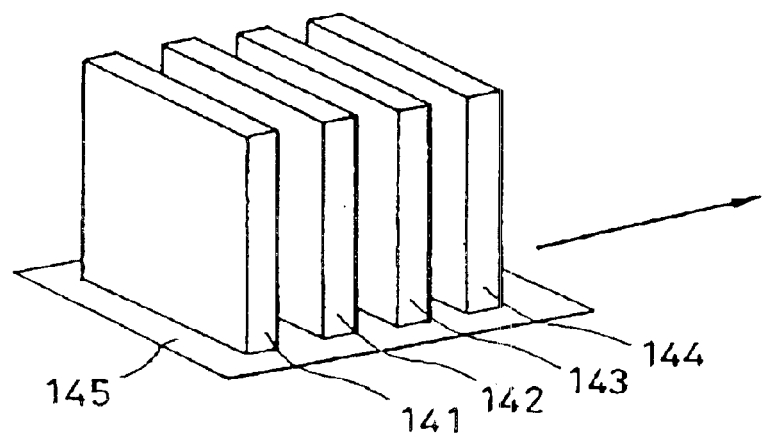
FIG. 12 is a perspective view of a recording portion in which a plurality of recording heads are arranged.

When a color image is formed by the ink-jet recording method according to the present embodiment, for example, a recording apparatus in which four recording heads as shown in FIG. 3 are arranged on a carriage is used. FIG. 12 shows an embodiment thereof. Recording heads 141, 142, 143, and 144 eject yellow ink (Y), magenta ink (M), cyan ink (C), and black ink (Bk), respectively. These heads are deployed in the aforementioned recording apparatus, and eject each of the inks responding to recording signals for ejection of each of the color inks, while, for example, a carriage is moved in the direction indicated by an arrow.

Figure 13:
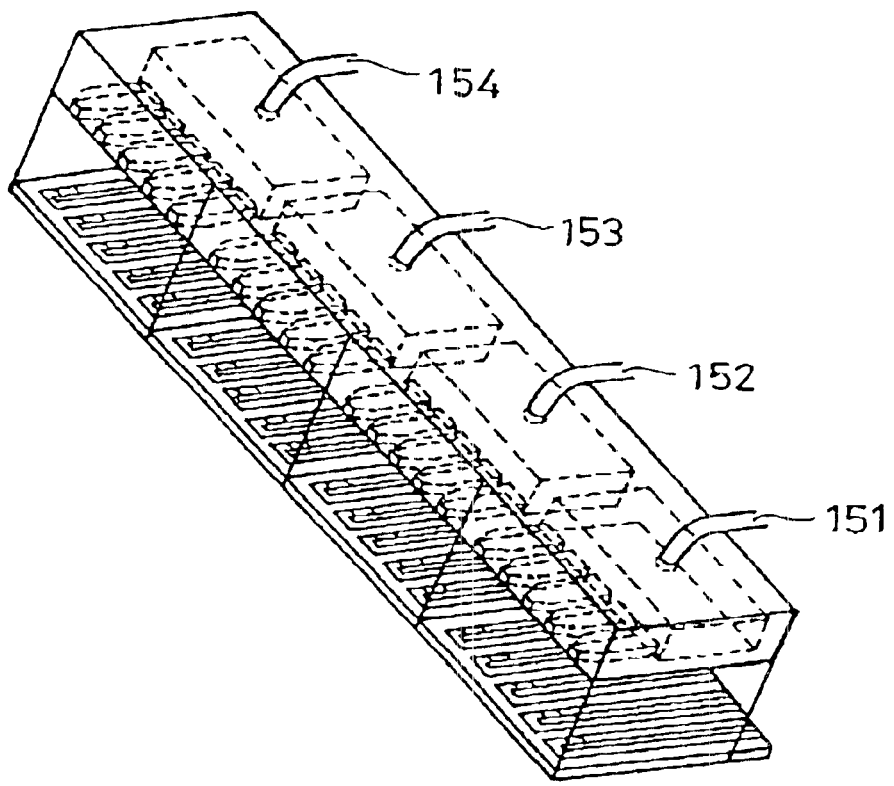
FIG. 13 is a perspective view of another recording head used for the present invention.

FIG. 12 shows an embodiment using four recording heads, although the present invention not limited to this number, and as shown In FIG. 13, it is also preferable to eject black ink 154, yellow ink 151, magenta ink 152, and cyan 153 from one recording head by separating liquid flow paths.

Figure 14:
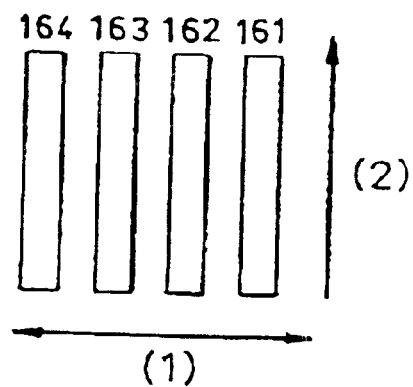
FIG. 14 is a diagram of a fourth configuration of a recording head.
Figure 15:
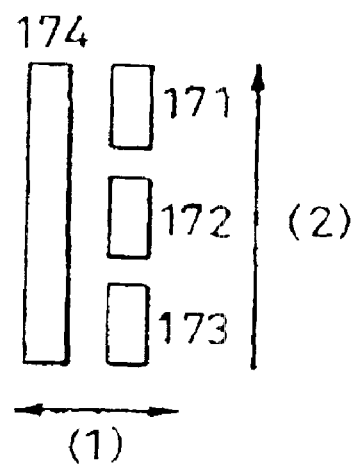
FIG. 15 is a diagram of a fifth configuration of a recording head.

Two examples of specific arrangements of the ink-jet recording head appropriately used in the present embodiment are shown in FIGS. 14 and 15. In FIGS. 14 and 15, reference numerals 161 to 164 and 171 to 174, respectively, indicate recording heads for ejecting inks of yellow (Y), magenta (M), Cyan (C) and black (Bk), respectively. Each of the recording heads is arranged on the carriage in a manner similar to that as shown in FIG. 12, although the arrangements differ depending on the exact configurations. Each of the recording heads is deployed in the aforementioned recording apparatus, and ejects respective inks responding to a recording signal. Each of the recording heads moves with the carriage in the direction indicated by an arrow (1), and the recording medium moves with feed roller, etc., in the direction indicated by an arrow (2).

In the configuration example as shown in FIG. 14, recording heads Bk (164), C (163), M (162), and Y (161) are arranged in parallel on the carriage. The second configuration example, as shown in FIG. 15, is composed of a recording head for the black ink (174), and recording heads C (173), M (172), and Y (171) arranged in series with each other, and in parallel to the aforementioned recording head. The present invention may be applied to a so-called line printer having a configuration corresponding to that as shown in FIG. 14, in which a carrier is fixed and a recording medium is moved with a feed roller, etc., in the direction indicated by an arrow (2).

EXAMPLES

The present invention will be specifically explained using examples and comparative examples, although the present invention is not limited to the following examples. In the following description, parts and % are on a weight basis, unless otherwise specified.

EXAMPLES AND COMPARATIVE EXAMPLES ACCORDING TO FIRST EMBODIMENT

Examples 1 to 33 and
Comparative Examples 1 to 11

Each of liquid compositions and color inks were prepared using the following components. Regarding the preparation of the liquid composition and the color ink using a dye as a coloring material, the following components were dissolved, and thereafter, were pressure-filtrated using a microfilter having a pore size of 0.2 μm (manufactured by Fuji Photo Film Co., Ltd.) so as to produce each of the liquid compositions and the color inks.

Regarding the color inks using dyes as coloring materials, pigment dispersion liquids were produced by respective ways, and the resulting dispersion liquids were mixed with liquid media, etc. Thereafter, the resulting mixtures were pressure-filtrated using a microfilter having a pore size of 3 μm (manufactured by Fuji Photo Film Co., Ltd.) so as to produce respective pigment inks.

Liquid compositions 1 to 4 were prepared from the following components. Liquid composition 4 corresponded to the Comparative Example.

Liquid Composition 1

| | |
|---|---|
| Diethylene glycol | 20 parts |
| Acetylenol EH (manufactured by Kawaken Fine Chemicals Co., Ltd.) | 2 parts |
| Magnesium nitrate · 6 hydrates | 2 parts |
| Taurine | 2 parts |
| Water | 74 parts |

Liquid Composition 2

| | |
|---|---|
| Triethylene glycol monobutyl ether | 10 parts |
| Glycerin | 10 parts |
| Magnesium gluconate | 4 parts |
| Taurine | 3 parts |
| Water | 73 parts |

Liquid Composition 3

| | |
|---|---|
| Triethylene glycol monobutyl ether | 10 parts |
| Glycerin | 10 parts |
| Calcium glycerophosphate | 1 part |
| Sodium aspartate | 2 parts |
| Water | 77 parts |

Liquid Composition 4

| | |
|---|---|
| Diethylene glycol | 20 parts |
| Acetylenol EH (manufactured by Kawaken Fine Chemicals Co., Ltd.) | 2 parts |
| Water | 78 parts |

Black Ink 1

Production of Pigment Dispersion Liquid 1

300 g of commercially available acidic carbon black "MA77" (pH of 3, manufactured by MITSUBISHI CHEMICAL CORPORATION) was sufficiently blended with 1,000 mL of water. Subsequently, 450 g of sodium hydrochlorite (effective chlorine concentration of 12%) was dropped thereto, and agitation was performed at 100° C. to 105° C. for 10 hours. The resulting slurry was filtrated with Toyo™ filter paper No. 2 (manufactured by Advantis Co.), and pigment particles were sufficiently washed with water. The resulting pigment wet cake was dispersed again in 3,000 mL of water, and was desalted with a reverse osmosis membrane until the electrical conductivity reached 0.2 $\mu$s. Furthermore, this pigment dispersion liquid (pH of 8 to 10) was concentrated to have a pigment concentration of 10% by weight. By the aforementioned method, -COONa group was introduced in the surface of the carbon black, so that Pigment Dispersion Liquid 1 including self-dispersion type carbon black was produced.

Preparation of Ink

The following components, including Pigment Dispersion Liquid 1 produced as described above, were mixed, and furthermore, were pressure-filtrated using a microfilter having a pore size of 3 $\mu$m (manufactured by Fuji Photo Film Co., Ltd.) so as to produce Black Ink 1.

| | |
|---|---|
| The aforementioned Pigment Dispersion Liquid 1 | 40 parts |
| Glycerin | 8 parts |
| Trimethylolpropane | 5 parts |
| Isopropyl alcohol | 4 parts |
| Water | 43 parts |

Black Ink 2

Production of Pigment Dispersion Liquid 2

| | |
|---|---|
| Styrene-acrylic acid-butyl acrylate copolymer (acid value of 116, average molecular weight of 3,700) | 5 parts |
| Triethanolamine | 0.5 parts |
| Diethylene glycol | 5 parts |
| Water | 69.5 parts |

The aforementioned components were mixed, and were heated to 70° C. with a water bath so as to completely dissolve the resin component. 15 parts of carbon black "MA-100" (pH of 3.5, manufactured by MITSUBISHI CHEMICAL CORPORATION) and 5 parts of 2-propanol were added to the resulting solution, and premixing was performed for 30 minutes. Thereafter, dispersion treatment was performed under the following conditions.

dispersing machines sand grinder (manufactured by Igarashi Kikai)

grinding media: zirconium beads of 1 mm in diameter grinding media filling factor: 50% by volume grinding time; 3 hours Subsequently, centrifugal separation treatment was performed at 12,000 $\mu$m for 20 minutes, so that coarse particles were removed and Pigment Dispersion Liquid 2 containing carbon black was produced.

Preparation of Ink

The following components, including Pigment Dispersion Liquid 2 produced as described above, were mixed, and furthermore, were pressure-filtrated using a microfilter having a pore size of 3 $\mu$m (manufactured by Fuji Photo Film Co., Ltd.) so as to produce Black Ink 2.

| | |
|---|---|
| The aforementioned Pigment Dispersion Liquid 2 | 20 parts |
| Trimethylolpropane | 5 parts |
| Diethylene glycol | 10 parts |
| 2-pyrrolidone | 5 parts |
| Acetylenol EH (manufactured by Kawaken Fine Chemicals Co., Ltd.) | 0.2 parts |
| Water | 59.8 parts |

Black Ink 3

The following components, including the aforementioned Example Compound 1 as a coloring material, were mixed, and furthermore, were pressure-filtrated using a microfilter having a pore size of 0.2 $\mu$m (manufactured by Fuji Photo Film Co., Ltd.) so as to produce Black Ink 3.

| | |
|---|---|
| The aforementioned Example Compound 1 (in the formula, M designates $NH_4^+$) | 2 parts |
| Diethylene glycol | 10 parts |
| 2-pyrrolidone | 5 parts |
| 2-propanol | 5 parts |
| Sodium hydroxide | 0.1 parts |
| Water | 77.9 parts |

Yellow Ink 1

Production of Pigment Dispersion Liquid 3

| | |
|---|---|
| Styrene-acrylic acid copolymer (acid value of 200, average molecular weight of 7,000) | 5.5 parts |
| Monoethanolamine | 1.0 part |

-continued

| | |
|---|---|
| Ion-exchanged water | 67.5 parts |
| Diethylene glycol | 5.0 parts |

The aforementioned components were mixed, and were heated to 70° C. with a water bath so as to completely dissolve the resin component. 20 parts of C.I. Pigment Yellow 93 and 1.0 part of isopropyl alcohol were added to the resulting solution, and premixing was performed for 30 minutes. Thereafter, dispersion treatment was performed under the following conditions.

dispersing machines: sand grinder
    grinding media: glass beads of 1 mm in diameter
    grinding media filling factor: 50% by volume
    grinding time: 3 hours Subsequently, centrifugal separation treatment was performed at 12,000 rpm for 20 minutes, so that coarse particles were removed and Pigment Dispersion Liquid 3 was produced.

Preparation of Ink

The following components, including Pigment Dispersion Liquid 3 produced as described above, were mixed, and furthermore, were pressure-filtrated using a microfilter having a pore size of 3 µm (manufactured by Fuji Photo Film Co., Ltd.) so as to produce Yellow Ink 1.

| | |
|---|---|
| The aforementioned Pigment Dispersion Liquid 3 | 20 parts |
| Glycerin | 15 parts |
| Diethylene glycol | 10 parts |
| Acetylenol EH (manufactured by Kawaken Fine Chemicals Co., Ltd.) | 0.3 parts |
| Water | 54.7 parts |

Yellow Ink 2

The following components, including the aforementioned Example Compound 2 as a coloring material, were mixed and dissolved. Thereafter, pressure filtration was performed using a microfilter having a pore size of 0.2 µm (manufactured by Fuji Photo Film Co., Ltd.) so as to produce Yellow Ink 2.

| | |
|---|---|
| The aforementioned Example Compound 2 (in the formula, M designates $NH_4^+$) | 3 parts |
| Glycerin | 7 parts |
| Diethylene glycol | 5 parts |
| Urea | 5 parts |
| Ethanol | 2 parts |
| Water | 88 parts |

Magenta Ink 1
Production of Pigment Dispersion Liquid 4

| | |
|---|---|
| Styrene-acrylic acid copolymer (acid value of 200, average molecular weight of 7,000) | 5.5 parts |
| Monoethanolamine | 1.0 part |
| Ion-exchanged water | 67.5 parts |
| Diethylene glycol | 5.0 parts |

The aforementioned components were mixed, and were heated to 70° C. with a water bath so as to completely dissolve the resin component. 20 parts of C.I. Pigment Red 122 and 1.0 part of isopropyl alcohol were added to the resulting solution, and premixing was performed for 30 minutes. Thereafter, dispersion treatment was performed under the following conditions.

dispersing machine: sand grinder
    grinding media: glass beads of 1 mm in diameter
    grinding media filling factor: 50% by volume
    grinding time: 3 hours Subsequently, centrifugal separation treatment was performed at 12,000 rpm for 20 minutes, so that coarse particles were removed and Pigment Dispersion Liquid 4 was produced.

Preparation of Ink

The following components, including Pigment Dispersion Liquid 4 produced as described above, were mixed, and furthermore, were pressure-filtrated using a microfilter having a pore size of 3 µm (manufactured by Fuji Photo Film Co., Ltd.) so as to produce Magenta Ink 1.

| | |
|---|---|
| Pigment Dispersion Liquid 4 | 20 parts |
| Glycerin | 15 parts |
| Diethylene glycol | 10 parts |
| Acetylenol EH (manufactured by Kawaken Fine Chemicals Co., Ltd.) | 0.3 parts |
| Water | 54.7 parts |

Magenta Ink 2

The following components, including the aforementioned Example Compound 3 as a coloring material, were mixed and dissolved. Thereafter, pressure filtration was performed using a microfilter having a pore size of 0.2 µm (manufactured by Fuji Photo Film Co., Ltd.) so as to produce Magenta Ink 2.

| | |
|---|---|
| The aforementioned Example Compound 3 (in the formula, M designates $NH_4^+$) | 3 parts |
| Glycerin | 7 parts |
| Diethylene glycol | 5 parts |
| Urea | 5 parts |
| Ethanol | 2 parts |
| Water | 88 parts |

Cyan Ink 1
Production of Pigment Dispersion Liquid 5

| | |
|---|---|
| Styrene-acrylic acid copolymer (acid value of 200, average molecular weight of 7,000) | 5.5 parts |
| Monoethanolamine | 1.0 part |
| Ion-exchanged water | 67.5 parts |
| Diethylene glycol | 5.0 parts |

The aforementioned components were mixed, and were heated to 70° C. with a water bath so as to completely dissolve the resin component. 20 parts of C.I. Pigment Blue 15:3 and 1.0 part of isopropyl alcohol were added to the resulting solution, and premixing was performed for 30 minutes. Thereafter, dispersion treatment was performed under the following conditions.

dispersing machine: sand grinder
    grinding media: glass beads of 1 mm in diameter
    grinding media filling factor: 50% by volume
    grinding time: 3 hours Subsequently, centrifugal separation treatment was performed at 12,000 rpm for 20 minutes, so that coarse particles were removed and Pigment Dispersion Liquid 5 was produced.

Preparation of Ink

The following components, including Pigment Dispersion Liquid 5 produced as described above, were mixed, and furthermore, were pressure-filtrated using a microfilter having a pore size of 3 μm (manufactured by Fuji Photo Film Co., Ltd.) so as to produce Cyan Ink 1.

| | |
|---|---|
| Pigment Dispersion Liquid 5 | 20 parts |
| Glycerin | 15 parts |
| Diethylene glycol | 10 parts |
| Acetylenol EH (manufactured by Kawaken Fine Chemicals Co., Ltd.) | 0.3 parts |
| Water | 54.7 parts |

Cyan Ink 2

The following components, including the aforementioned Example Compound 4 as a coloring material, were mixed and dissolved. Thereafter, pressure filtration was performed using a microfilter having a pore size of 0.2 μm (manufactured by Fuji Photo Film Co., Ltd.) so as to produce Cyan Ink 2.

| | |
|---|---|
| The aforementioned Example Compound 4 (in the formula, M designates $NH_4^+$) | 3 parts |
| Glycerin | 7 parts |
| Diethylene glycol | 5 parts |
| Urea | 5 parts |
| Ethanol | 2 parts |
| Water | 88 parts |

Evaluation and Evaluation Criteria

Evaluation Test

Evaluation tests will be described below.

Evaluation 1

Liquid Compositions 1 to 3 having configurations according to the present invention and Liquid Composition 4 of the Comparative Example produced as described above were evaluated by ejecting the liquid compositions using an ink-jet recording apparatus including an on-demand type multi-recording head BC-02 (manufactured by CANON KABUSHIKI KAISHA, and an outermost surface protection layer on a heater is made of tantalum and tantalum oxide), which ejects liquid compositions by applying thermal energy to inks responding to a recording signal, under the following condition. Regarding the liquid composition ejection condition of the aforementioned ink-jet recording apparatus, $V_{th}$ (a critical voltage required for ejection at a minimum level) was measured with a pulse width of 1.1 μs (On)+3.0 μs (Off)+3.2 μs (On) and driving frequency of 6,250 Hz, and thereafter, the liquid composition was ejected applying $V_{op}$ (driving voltage) which corresponds to r value of 1.6. Ejection durability and occurrence status of kogation adhesion to the heater of the ink-jet recording head when ink-jet recording were performed under the aforementioned condition were evaluated based on the following method and criteria. The results thereof are as shown in Table 1.

1. Ejection durability

Continuous ejection was performed with the aforementioned apparatus and conditions, and droplets ejected from the recording head were collected into a container at intervals of $1 \times 10^6$ times of ejection, and were weighed with an electrobalance. An average ejection droplet quantity of $1 \times 10^6$ times of ejection was calculated from increase in weight of the container. The continuous ejection was performed until $1 \times 10^8$ times, and evaluation was performed based on the following criteria.

A: the average ejection droplet quantity of $9.9 \times 10^7$ times to $1 \times 10^8$ times was 90% or more of the average ejection droplet quantity of 0 to $1 \times 10^6$ times.

B: the average ejection droplet quantity of $9.9 \times 10^7$ times to $1 \times 10^8$ times was less than 90%, but 70% or more of the average ejection droplet quantity of 0 to $1 \times 10^6$ times.

C. the average ejection droplet quantity of $9.9 \times 10^7$ times to $1 \times 10^8$ times was less than 70% of the average ejection droplet quantity of 0 to $1 \times 10^6$ times.

D. ejection became impossible during the continuous ejection.

2. Quantity of Kogation Adhesion

The recording head, on which the aforementioned evaluation of ejection durability of head was completed, was disassembled, and the surface of the heater of the nozzle used for the ejection durability test was visually inspected with an optical microscope (magnification of 400 times) so as to determine the quantity of kogation adhesion and to evaluate the quantity of kogation adhesion based on the following criteria.

A: kogation adhesion was hardly observed.
B: kogation adhesion was observed to some degree.
C: kogation adhesion was observed to a large degree.
D: kogation adhesion was observed to very large degree.

TABLE 1

| | | 1. Ejection Durability | 2. Kogation Adhesion Quantity |
|---|---|---|---|
| Example 1 | Liquid Composition 1 | A | A |
| Example 2 | Liquid Composition 2 | A | A |
| Example 3 | Liquid Composition 3 | A | A |
| Comparative Example 1 | Liquid Composition 4 | A | A |

Evaluation 2

Recording was performed on a recording paper using each of the color inks and each of Liquid Compositions 1 to 3 prepared as described above in combinations as shown in Table 2. As the ink-jet recording apparatus, a recording apparatus having a configuration similar to that as shown in FIG. 4 was used, and an image was formed using two recording heads among the five recording heads as shown in FIG. 7. At this time, the liquid composition was under picked so as to adhere on the recording paper, and subsequently, the color ink was adhered. The position of the adhesion of the liquid composition on the recording paper and the position of the adhesion of the color ink on the recording paper were controlled to precisely coincide with each other. The recording head used for this recording had a record density of 360 dpi, and the driving frequency was specified to be 5 kHz. The ejection volume per dot of the head used for the color ink was 80 pl/dot, and that of the head used for the liquid composition was 40 pl/dot. As the recording paper, a paper manufactured by CANON KABUSHIKI KAISHA, (trade name: PB paper) and a paper manufactured by Xerox Corporation, (trade name: 4024 paper) were used.

3. Water Resistance of Image

Printing was performed using each of the color inks and each of the liquid compositions in combinations as shown in Table 2 by the aforementioned method. The print was stood for 1 hour, and thereafter, print density was measured with a Macbeth RD915 (trade name, manufactured by Macbeth). Subsequently, this print was immersed for 3 minutes in a container filled with tap water, was removed, and dried. Then, the print density was measured again, and the density retention rate of the print was determined so as to evaluate water resistance. The density retention rate is preferably 95% or more in practice. The results of the evaluation are shown in Table 2. The evaluation criteria were as described below.

print density retention rate (print density after immersion in water/print density before immersion in water)×100

A: print density retention rate is 95% or more.

B; print density retention rate is 85% or more, but 95% or less.

C: print density retention rate is less than 85%.

4. Print Quality of Image (Bleeding)

Printing of alphanumeric characters (12 points) was performed in a manner similar to that as described above, and after standing for 1 hour, sharpness of the characters and degree of whisker-like bleeding generated from the characters were evaluated based on a visual inspection. The results of the evaluation are shown in Table 2. The evaluation criteria were as described below.

A: character has sharpness and whisker-like bleeding was not observed.

B: character does not have sharpness and bleeding was observed to some degree.

C: character does not have sharpness and bleeding was observed to a great degree.

TABLE 2

| | Combination Used For Ink-Jet Recording | | 3. Water Resistance | | 4. Print Quality | |
|---|---|---|---|---|---|---|
| | Liquid Composition | Colored Ink | PB Paper | 4024 Paper | PB Paper | 4024 Paper |
| Example 4 | Liquid Composition 1 | Black 1 (self-dispersion pigment | A | A | A | A |
| Example 5 | Liquid Composition 1 | Black 2 (pigment) | A | A | A | A |
| Example 6 | Liquid Composition 1 | Black 3 (dye) | A | A | A | A |
| Example 7 | Liquid Composition 1 | Yellow 1 (pigment) | A | A | A | A |
| Example 8 | Liquid Composition 1 | Yellow 2 (dye) | A | A | A | A |
| Example 9 | Liquid Composition 1 | Magenta 1 (pigment) | A | A | A | A |
| Example 10 | Liquid Composition 1 | Magenta 2 (dye) | A | A | A | A |
| Example 11 | Liquid Composition 1 | Cyan 1 (pigment) | A | A | A | A |
| Example 12 | Liquid Composition 1 | Cyan 2 (dye) | A | A | A | A |
| Example 13 | Liquid Composition 2 | Black 1 (self-dispersion pigment | A | A | A | A |
| Example 14 | Liquid Composition 2 | Black 2 (pigment) | A | A | A | A |
| Example 15 | Liquid Composition 2 | Black 3 (dye) | A | A | A | A |
| Example 16 | Liquid Composition 2 | Yellow 1 (pigment) | A | A | A | A |
| Example 17 | Liquid Composition 2 | Yellow 2 (dye) | A | A | A | A |
| Example 18 | Liquid Composition 2 | Magenta 1 (pigment) | A | A | A | A |
| Example 19 | Liquid Composition 2 | Magenta 2 (dye) | A | A | A | A |
| Example 20 | Liquid Composition 2 | Cyan 1 (pigment) | A | A | A | A |
| Example 21 | Liquid Composition 2 | Cyan 2 (dye) | A | A | A | A |
| Example 22 | Liquid Composition 3 | Black 1 (self-dispersion pigment | A | A | A | A |
| Example 23 | Liquid Composition 3 | Black 2 (pigment) | A | A | A | A |
| Example 24 | Liquid Composition 3 | Black 3 (dye) | A | A | A | A |
| Example 25 | Liquid Composition 3 | Yellow 1 (pigment) | A | A | A | A |
| Example 26 | Liquid Composition 3 | Yellow 2 (dye) | A | A | A | A |
| Example 27 | Liquid Composition 3 | Magenta 1 (pigment) | A | A | A | A |
| Example 28 | Liquid Composition 3 | Magenta 2 (dye) | A | A | A | A |
| Example 29 | Liquid Composition 3 | Cyan 1 (pigment) | A | A | A | A |
| Example 30 | Liquid Composition 3 | Cyan 2 (dye) | A | A | A | A |
| Comparative Example 2 | Liquid Composition 4 | Black 1 (self-dispersion pigment | A | A | B | B |
| Comparative Example 3 | Liquid Composition 4 | Black 2 (pigment) | A | A | B | B |
| Comparative Example 4 | Liquid Composition 4 | Black 3 (dye) | C | C | C | C |
| Comparative Example 5 | Liquid Composition 4 | Yellow 1 (pigment) | A | A | B | B |
| Comparative Example 6 | Liquid Composition 4 | Yellow 2 (dye) | B | B | C | C |
| Comparative Example 7 | Liquid Composition 4 | Magenta 1 (pigment) | A | A | B | B |
| Comparative Example 8 | Liquid Composition 4 | Magenta 2 (dye) | C | C | C | C |
| Comparative Example 9 | Liquid Composition 4 | Cyan 1 (pigment) | A | A | B | B |
| Comparative Example 10 | Liquid Composition 4 | Cyan 2 (dye) | C | C | C | C |

5. Bleeding (Color Mixed Bleeding Between Different Colors)

An ink set composed of a liquid composition and color inks in each of combinations as shown in Table 3 was used. The aforementioned two kinds of plain papers were printed with solid patches of the liquid composition, and immediately after that, the papers were printed with solid patches of the black ink on the region of the solid patches of the liquid composition. Furthermore, immediately after that, the papers were printed with solid patches of each of yellow, magenta, and cyan inks on the region of the solid patches of the liquid composition adjacently to the solid patches of the black ink. The boundary portions of the resulting solid patch prints were visually inspected so as to evaluate bleeding between the black ink and each of the color inks. The evaluation criteria were as described below.

A: Bleeding is not observed at all boundaries.

B: Bleedings are observed to some degree, but those are not obtrusive.

C: Bleedings are observed to a large degree at almost every boundary.

The results of the evaluation are shown in Table 3.

TABLE 3

| | Ink Set | | | | 5. Bleeding | |
|---|---|---|---|---|---|---|
| | Liquid Composition | Black Ink | Color Ink | | | |
| | | | | | PB Paper | 4024 Paper |
| Example 31 | Liquid Composition 1 | Black 1 (self-dispersion pigment) | Yellow 1 (pigment) | Magenta 1 (pigment) | Cyan 1 (pigment) | A | A |
| Example 32 | Liquid Composition 1 | Black 3 (dye) | Yellow 2 (dye) | Magenta 2 (dye) | Cyan 2 (dye) | A | A |
| Example 33 | Liquid Composition 2 | Black 1 (self-dispersion pigment) | Yellow 1 (pigment) | Magenta 1 (pigment) | Cyan 1 (pigment) | A | A |
| Example 34 | Liquid Composition 2 | Black 3 (dye) | Yellow 2 (dye) | Magenta 2 (dye) | Cyan 2 (dye) | A | A |
| Example 35 | Liquid Composition 3 | Black 1 (self-dispersion pigment) | Yellow 1 (pigment) | Magenta 1 (pigment) | Cyan 1 (pigment) | A | A |
| Example 36 | Liquid Composition 3 | Black 3 (dye) | Yellow 2 (dye) | Magenta 2 (dye) | Cyan 2 (dye) | A | A |
| Comparative Example 11 | Liquid Composition 4 | Black 1 (self-dispersion pigment) | Yellow 1 (pigment) | Magenta 1 (pigment) | Cyan 1 (pigment) | C | C |
| Comparative Example 12 | Liquid Composition 4 | Black 3 (dye) | Yellow 2 (dye) | Magenta 2 (dye) | Cyan 2 (dye) | C | C |

EXAMPLES AND COMPARATIVE EXAMPLE ACCORDING TO SECOND EMBODIMENT

Examples 37 to 39 and Comparative Example 13

Ink sets of Examples 37 to 39 and Comparative Example 13 were produced by the combination of the black ink and the color inks of yellow, magenta, and cyan. Each of the inks was produced by the following methods using the components as described below. The black ink constituting each of the ink set was prepared by blending the aforementioned Pigment Dispersion Liquid 1 or 2 with the components as described below, and subsequently, by pressure-filtrating the resulting mixture using a microfilter having a pore size of 3 μm (manufactured by Fuji Photo Film Co., Ltd.). Each of the color ink which includes a dye, and constitutes each of ink sets, was prepared by blending the components as described below, and subsequently, by pressure-filtrating the resulting mixture using a microfilter having a pore size of 0.2 μm (manufactured by Fuji Photo Film Co., Ltd.). Primary compositions of the ink sets of Examples 37 to 39 and Comparative Example 13 are as shown in Table 4.

Ink Set of Example 37

Black Ink Composition

| | |
|---|---|
| The aforementioned Pigment Dispersion Liquid 1 | 40 parts |
| Glycerin | 8 parts |
| Trimethylolpropane | 5 parts |
| Isopropyl alcohol | 4 parts |
| Water | 43 parts |

Yellow Ink Composition

| | |
|---|---|
| C.I. Acid Yellow 23 | 2.5 parts |
| Glycerin | 5 parts |
| Diethylene glycol | 5 parts |
| Acetylenol EH (manufactured by Kawaken Fine Chemicals Co., Ltd.) | 1 part |
| Magnesium acetate·4 hydrates | 2 parts |
| Taurine | 1 part |
| Water | 83.5 parts |

Magenta Ink Composition

| | |
|---|---|
| C.I. Acid Red 289 | 2 parts |
| Glycerin | 8 parts |
| Diethylene glycol | 5 parts |
| Acetylenol EH (manufactured by Kawaken Fine Chemicals Co., Ltd.) | 1 part |
| Magnesium nitrate·6 hydrates | 1 parts |
| Sodium aspartate | 0.5 parts |
| Water | 82.5 parts |

Cyan Ink Composition

| | |
|---|---|
| C.I. Acid Blue 9 | 2 parts |
| Glycerin | 8 parts |
| Diethylene glycol | 5 parts |
| Acetylenol EH (manufactured by Kawaken Fine Chemicals Co., Ltd.) | 1 part |

-continued

| | |
|---|---|
| Magnesium nitrate·6 hydrates | 1 part |
| Taurine | 1 part |
| Water | 82 parts |

Ink Set of Example 38

Black Ink Composition

| | |
|---|---|
| The aforementioned Pigment Dispersion Liquid 1 | 40 parts |
| Glycerin | 5 parts |
| Diethylene glycol | 5 parts |
| 2-pyrrolidone | 5 parts |
| Acetylenol EH (manufactured by Kawaken Fine Chemicals Co., Ltd.) | 0.3 parts |
| Water | 44.7 parts |

Yellow Ink Composition

| | |
|---|---|
| C.I. Acid Yellow 23 | 2.5 parts |
| Glycerin | 5 parts |
| Diethylene glycol | 5 parts |
| Trimethylolpropane | 5 parts |
| Acetylenol EH (manufactured by Kawaken Fine Chemicals Co., Ltd.) | 1 part |
| Magnesium gluconate | 1 part |
| Taurine | 1 part |
| Water | 79.5 parts |

Magenta Ink Composition

| | |
|---|---|
| C.I. Acid Red 289 | 2 parts |
| Glycerin | 8 parts |
| Diethylene glycol | 5 parts |
| Thiodiglycol | 5 parts |
| Acetylenol EH (manufactured by Kawaken Fine Chemicals Co., Ltd.) | 1 part |
| Magnesium gluconate | 1.5 parts |
| Taurine | 1 part |
| Water | 76.5 parts |

Cyan Ink Composition

| | |
|---|---|
| C.I. Acid Blue 9 | 2 parts |
| Ethylene glycol | 8 parts |
| Diethylene glycol | 5 parts |
| Trimethylolpropane | 5 parts |
| Acetylenol EH (manufactured by Kawaken Fine Chemicals Co., Ltd.) | 1 part |
| Calcium gluconate | 1 part |
| Taurine | 1 part |
| Water | 77 parts |

Ink Set of Example 39

Black Ink Composition

| | |
|---|---|
| The aforementioned Pigment Dispersion Liquid 2 | 20 parts |
| Trimethylolpropane | 5 parts |
| Diethylene glycol | 10 parts |
| 2-pyrrolidone | 5 parts |
| Acetylenol EH (manufactured by Kawaken Fine Chemicals Co., Ltd.) | 0.2 parts |
| Water | 59.8 parts |

Yellow Ink Composition

| | |
|---|---|
| C.I. Acid Yellow 23 | 2.5 parts |
| Glycerin | 5 parts |
| Diethylene glycol | 5 parts |
| Trimethylolpropane | 5 parts |
| Acetylenol EH (manufavtured by Kawaken Fine Chemicals Co., Ltd.) | 1 part |
| Calcium glycerophosphate | 1 part |
| Taurine | 1 part |
| Water | 79.5 parts |

Magenta Ink Composition

| | |
|---|---|
| C.I. Acid Red 289 | 2 parts |
| Glycerin | 8 parts |
| Diethylene glycol | 5 parts |
| Thiodiglycol | 5 parts |
| Acetylenol EH (manufactured by Kawaken Fine Chemicals Co., Ltd.) | 1 part |
| Calcium glycerophosphate | 1 part |
| Taurine | 1 part |
| Water | 77 parts |

Cyan Ink Composition

| | |
|---|---|
| C.I. Acid Blue 9 | 2 parts |
| Ethylene glycol | 8 parts |
| Diethylene glycol | 5 parts |
| Trimethylolpropane | 5 parts |
| Acetylenol EH (manufactured by Kawaken Fine Chemicals Co., Ltd.) | 1 part |
| Calcium glycerophosphate | 1 part |
| Taurine | 1 part |
| Water | 84.5 parts |

Ink Set of Comparative Example 13

Black Ink Composition

| | |
|---|---|
| The aforementioned Pigment Dispersion Liquid 1 | 40 parts |
| Glycerin | 8 parts |
| Trimethylolpropane | 5 parts |
| Isopropyl alcohol | 4 parts |
| Water | 43 parts |

Yellow Ink Composition

| | |
|---|---|
| C.I. Acid Yellow 23 | 2.5 parts |
| Glycerin | 5 parts |
| Diethylene glycol | 5 parts |
| Acetylenol EH (manufactured by Kawaken Fine Chemicals Co., Ltd.) | 1 part |
| Water | 86.5 parts |

Magenta Ink Composition

| | |
|---|---|
| C.I. Acid Red 289 | 2 parts |
| Glycerin | 8 parts |
| Diethylene glycol | 5 parts |
| Acetylenol EH (manufactured by Kawaken Fine Chemicals Co., Ltd.) | 1 part |
| Water | 84 parts |

Cyan Ink Composition

| | |
|---|---|
| C.I. Acid Blue 9 | 2 parts |
| Glycerin | 8 parts |
| Diethylene glycol | 5 parts |
| Acetylenol EH (manufactured by Kawaken Fine Chemicals Co., Ltd.) | 1 part |
| Water | 84 parts |

TABLE 4

Primary Composition of Ink Set

| Ink Set | Kind of Ink | Coloring Material | Polyvalent Metal Salt | Acid Including Amino Group |
|---|---|---|---|---|
| Example 37 | Black | Dispersion Liquid 1 | — | — |
| | Yellow | Acid Y-23 | Magnesium acetate | Taurine |
| | Magenta | Acid R-289 | Magnesium nitrate | Aspartic acid |
| | Cyan | Acid B-9 | Magnesium acetate | Taurine |
| Example 38 | Black | Dispersion Liquid 1 | — | — |
| | Yellow | Acid Y-23 | Magnesium gluconate | Taurine |
| | Magenta | Acid R-289 | Magnesium gluconate | Taurine |
| | Cyan | Acid B-9 | Calcium gluconate | Taurine |
| Example 39 | Black | Dispersion Liquid 2 | — | — |
| | Yellow | Acid Y-23 | Calcium grycerophosphate | Taurine |
| | Magenta | Acid R-289 | Calcium grycerophosphate | Taurine |
| | Cyan | Acid B-9 | Calcium grycerophosphate | Taurine |
| Comparative Example 13 | Black | Dispersion Liquid 1 | — | — |
| | Yellow | Acid Y-23 | — | — |
| | Magenta | Acid R-289 | — | — |
| | Cyan | Acid B-9 | — | — |

Evaluation Test

Evaluation tests will be described below.

Evaluation 1

Evaluation was performed by ejecting the inks of the ink set or the aforementioned Examples 37 to 39 and Comparative Example 13 using an ink-jet recording apparatus including an on-demand type multi-recording head BC-02 (manufactured by CANON KABUSHIKI KAISHA, and an outermost surface protection layer on a heater is made of tantalum and tantalum oxide), which ejects inks by applying thermal energy to inks responding to a recording signal, under the following condition. Regarding the ink ejection condition of the aforementioned ink-jet recording apparatus, $V_{th}$ (a critical voltage required for ejection at a minimum level) was measured with a pulse width of 1.1 $\mu$s (on)+3.0 $\mu$s (off)+3.2 $\mu$s (On) and driving frequency of 6,250 Hz, and thereafter, the ink was ejected applying $V_{op}$, (driving voltage) which corresponds to r value of 1.6. Ejection durability and occurrence status of kogation adhesion to the heater of the ink-jet recording head when ink-jet recording were performed under the aforementioned condition were evaluated based on the following method and criteria. The results thereof are as shown in FIG. 5.

1. Ejection Durability

Continuous ejection was performed with the aforementioned apparatus and conditions, and droplets ejected from the recording head were collected into a container at intervals of $1 \times 10^6$ times of election, and were weighed with an electrobalance. An average ejection droplet quantity of $1 \times 10^6$ times of ejection was calculated from increase in weight of the container. The continuous ejection was performed until $1 \times 10^8$ times, and evaluation was performed based on the following criteria.

A: the average ejection droplet quantity of $9.9 \times 10^7$ times to $1 \times 10^8$ times was 90% or more of the average ejection droplet quantity of 0 to $1 \times 10^6$ times.

B: the average ejection droplet quantity of $9.9 \times 10^7$ times to $1 \times 10^8$ times was less than 90%, but 70% or more of the average ejection droplet quantity of 0 to $1 \times 10^6$ times.

C: the average ejection droplet quantity of $9.9 \times 10^7$ times to $1 \times 10^8$ times was less than 70% of the average ejection droplet quantity of 0 to $1 \times 10^6$ times.

D: ejection became impossible during the continuous ejection.

2. Quantity of Kogation Adhesion

The recording head, on which the aforementioned evaluation of ejection durability of head was completed, was disassembled, and the surface of the heater of the nozzle used for the ejection durability test was visually inspected with an optical microscope (magnification of 400 times) so as to evaluate the quantity of kogation adhesion based on the following criteria.

A: kogation adhesion was hardly observed.

B: kogation adhesion was observed to some degree.

C: kogation adhesion was observed to a large degree.

D: kogation adhesion was observed to a very large degree.

TABLE 5

| Ink Set | Kind of Ink | 1. Ejection Durability | 2. Kogation Adhesion Quantity |
|---|---|---|---|
| Example 37 | Black | A | B |
| | Yellow | A | B |
| | Magenta | A | B |
| | Cyan | A | B |
| Example 38 | Black | A | B |
| | Yellow | A | B |
| | Magenta | A | B |
| | Cyan | A | B |
| Example 39 | Black | A | B |
| | Yellow | A | B |
| | Magenta | A | B |
| | Cyan | A | B |
| Comparative Example 13 | Black | A | B |
| | Yellow | A | B |
| | Magenta | A | B |
| | Cyan | A | B |

Evaluation 2

Examples 37 to 42 and Comparative Examples 13 and 14

Each of the inks of the ink sets of Examples 37 to 39 according to the present invention and comparative Example 13 was mounted on a color ink-jet printer (BJC-700J, manufactured by CANON KABUSHIKI KAISHA), that is, an ink-jet recording apparatus including an on-demand type multi-recording head, which ejects inks by applying thermal energy to the inks responding to a recording signal. Subsequently, evaluation regarding the following items 3 and 4 were performed.

Images were produced using Examples 37 to 39 according to the present invention and Comparative Example 13 by applying the black ink and the color ink at the same position on the recording medium wherein the application of the color ink is prior to the application of the black ink (under pick). The ink-jet recordings by the under pick method using the ink sets of Examples 37 to 39 were taken as Examples 40 to 42, respectively, and the ink-jet recording by the under pick method using the ink set of Comparative Example 13 was taken as Comparative Examples 14. The evaluation thereof was performed in a manner similar to that as described above. Regarding the ratio of the application quantity of the black ink to that of the color ink per area of the recording medium, the ratio of the black ink to the color ink was specified to be 10:2.5, and regarding the ratio among the color inks, the ratio of yellow ink to magenta ink to cyan ink was specified to be 1:1:1. As the paper for the evaluation test, two kinds of plain paper, a copying paper manufactured by CANON KABUSHIKI KAISHA (trade name: PB PAPER) and a copying paper manufactured by Xerox Corporation (trade name: 4024 PAPER), were used. The results thereof are as shown in Table 6.

3. Bleeding between Black Ink and Color Ink

The aforementioned two kinds of plain papers were printed with solid patches of the black ink in each of the ink sets, and immediately after that, the papers were printed with solid patches of each of yellow, magenta, and cyan color inks adjacently to the solid patches of the black ink. The boundary portions of the resulting solid patch prints were visually inspected so as to evaluate bleeding between the black ink and the color inks. The evaluation criteria were as described below.

A: Bleeding is not observed at all boundaries.

B: Bleedings are observed to some degree.

C: Bleedings are observed to a large degree at almost every boundary.

4. Density of Black Ink Portion at Adjacent Boundary Portions between Black Ink and Color Ink (Occurrence of White Haze)

The aforementioned two kinds of plain papers were printed with solid patches of the black ink in each of the ink sets, and immediately after that, the papers were printed with solid patches of each of yellow, magenta, and cyan inks adjacently to the solid patches of the black ink. The occurrence of white haze at the adjacent boundary portions between the black ink and the color inks were visually inspected so as to evaluate. The evaluation criteria were as described below.

A: Reduction of density is not observed in the boundary portion, and white haze does not occur.

B: Reduction of density is observed in the boundary portion, and occurrence of white haze is observed, although these do not cause any problem in practice.

C: Reduction of density is observed to a large degree in the boundary portion, and occurrence of white haze is observed to a large degree.

TABLE 6

| | Under Pick | 3. Bleeding between Black Ink and Color Ink | | 4. White haze between Black Ink and Color Ink | |
|---|---|---|---|---|---|
| | | PB paper | XX paper | PB paper | XX paper |
| Example 37 | Not Performed | A | A | B | B |
| Example 38 | Not Performed | A | A | B | B |
| Example 39 | Not Performed | A | A | B | B |
| Example 40 | Performed | A | A | A | A |
| Example 41 | Performed | A | A | A | A |
| Example 42 | Performed | A | A | A | A |
| Comparative Example 13 | Not Performed | C | C | C | C |
| Comparative Example 14 | Performed | C | C | B | B |

In Table 6, the term PB paper represents the copying paper manufactured by CANON KABUSHIKI KAISHA (trade name: PB PAPER), and the term XX paper represents the copying paper manufactured by Xerox Corporation (trade name: 4024 PAPER).

As described above, according to the present invention, the liquid composition, which has water resistance and excellent print quality, and can reduce color bleeding that occurs in formation of color images, and furthermore, which can achieve long-life ink-jet recording heads, as well as the ink for ink-jet, the ink set for ink-jet recording, the ink-jet recording method, the recording unit, the ink cartridge, and the ink-jet recording apparatus are provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink set for ink-jet recording comprising:
   (1) a color ink comprising a coloring material, a liquid medium, a polyvalent metal salt, and a material selected from the group consisting of acids having amino groups and salts thereof; and
   (2) a black ink which comprises a coloring material and a liquid medium, and reacts with said color ink by contact with said color ink.

2. The ink set for ink-jet recording according to claim 1, wherein the total content of said polyvalent metal salts is 0.005% to 20% by mass based on the total amount of said color ink, and the total content of said materials selected from the group consisting of acids having amino groups and salts thereof is 0.005% to 20% by mass based on the total amount of said color ink.

3. The ink set for ink-jet recording according to claim 1 or 2, wherein said polyvalent metal salt is at least one selected from the group consisting of polyvalent metal salts of nitric acid, acetic acid, hydroxycarboxylic acid, and polyol phosphate.

4. The ink set for ink-jet recording according to claim 3, wherein said polyvalent metal salt of nitric acid, acetic acid, hydroxycarboxylic acid, or polyol phosphate is at least one selected from the group consisting of magnesium nitrate, calcium nitrate, barium nitrate, iron(II) nitrate, copper(II) nitrate, zinc nitrate, magnesium acetate, calcium acetate, barium acetate, iron(II) acetate, copper(II) acetate, zinc acetate, magnesium gluconate, calcium gluconate, barium gluconate, iron(II) gluconate, copper(II) gluconate, zinc gluconate, magnesium glycerophosphate, and calcium glycerophosphate.

5. The ink set for ink-jet recording according to claim 1, wherein said acid having an amino group is at least one selected from the group consisting of amidosulfuric acid (sometimes called sulfamic acid), aminomethanesulfonic acid, taurine (sometimes called 2-aminoethanesulfonic acid), carbamic acid, glycine, alanine, β-alanine, aspartic acid, and glutamic acid.

6. The ink set for inkjet recording according to claim 1, wherein said coloring material of said black ink is at least one selected from the group consisting of carbon black and pigments.

7. The ink set for ink-jet recording according to claim 1, wherein said coloring material of said black ink is a dye having at least one carboxylic group.

8. The ink set for ink-jet recording according to claim 1, wherein each of water contents in said black ink and said color ink is 35% to 96% by mass based on the total amount of said respective inks.

9. The ink set for inkjet recording according to claim 1, wherein said color ink is at least one ink selected from the group consisting of yellow ink, magenta ink, and cyan ink.

10. The ink set for ink-jet recording according to claim 1, which is used for an ink-jet printer comprising a recording head comprising:

a heater applying thermal energy to ink in order to eject said ink from an orifice; and an outermost surface protection layer containing a material selected from the group consisting of metals and metal oxides in order to protect said heater.

11. The ink set for ink-jet recording according to claim 10, wherein said outermost surface protection layer contains tantalum or tantalum oxide as said material selected from the group consisting of metals and metal oxides.

12. A recording unit comprising:

ink container portions containing each of inks constituting an ink set according to claim 1; and an ink-jet recording head for ejecting each of inks supplied from said ink container portions by applying energy to said inks.

13. The recording unit according to claim 12, wherein said ink-jet recording head comprises a heater having an outermost surface protection layer containing a material selected from the group consisting of metals and metal oxides.

14. The recording unit according to claim 13, wherein the outermost surface protection layer contains tantalum or tantalum oxide as said material selected from the group consisting of metals and metal oxides.

15. An ink cartridge comprising ink container portions containing each of inks constituting an ink set according to claim 1.

16. An ink-jet recording apparatus comprising:

an ink container portion containing an ink set comprising at least a black ink and a color ink; and an ink-jet recording head for ejecting each of inks supplied from said ink container portion by applying energy to said inks, wherein said ink set is an ink set according to claim 1.

17. The ink-jet recording apparatus according to claim 16, wherein said ink-jet recording head comprises a heater having an outermost surface protection layer containing a material selected from the group consisting of metals and metal oxides, and a device for applying an electrical pulse signal to said heater responding to recording information.

18. The ink-jet recording apparatus according to claim 17, wherein said outermost surface protection layer contains tantalum or tantalum oxide as said material selected from the group consisting of metals and metal oxides.

19. The ink-jet recording apparatus according to claim 16, wherein the energy ($E_{op}$) applied to the heater satisfies the following relationship, $$1.10 \leq E_{op}/E_{th} \leq 1.90,$$

wherein $E_{th}$ is a minimum energy for the heater to eject said color ink from said recording head.

20. An ink-jet recording method comprising the steps of:

(i) ejecting the black ink according to claim 1 toward a recording medium; and (ii) ejecting the color ink according to claim 1 toward the recording medium, steps (i) and (ii) being conducted so that the black ink and the color ink form a contact state on the recording medium.

21. The ink-jet recording method according to claim 20, wherein said black ink and said color ink are applied to a recording medium so as to overlap each other on the recording medium, and step (ii) is conducted prior to the step (i).

22. The ink-jet recording method according to claim 20, wherein said energy is thermal energy.

* * * * *

UNITED STATES PATENT AND TRADEMARK OFFICE
CERTIFICATE OF CORRECTION

PATENT NO. : 6,827,434 B1
DATED : December 7, 2004
INVENTOR(S) : Katsuragi et al.

It is certified that error appears in the above-identified patent and that said Letters Patent is hereby corrected as shown below:

Column 5,
Line 10, "*c" should read -- *C --;
Line 57, "Cluconic" should read -- Gluconic --; and
Line 59, "y-gluconic" should read -- γ-gluconic--.

Column 6,
Line 52, "amidosulturic" should read -- amidosulfuric --; and
Line 56, "carbanic" should read -- carbamic --.

Column 11,
Line 25, "EXAMPLE COMPOUND 10" should read -- EXAMPLE COMPOUND 11 --; and
Line 53, "EXAMPLE COMPOUND 11" should read -- EXAMPLE COMPOUND 10 --.

Column 14,
Line 8, "NH" (first occurrence) should read -- $NH_2$ --.

Column 15,
Line 57, "$(SO_3H)_{1-4}$" should read -- $(SO_3H)_{1.4}$ --.

Column 16,
Lines 3, 17, 30, 43 and 57, "$(SO_3H)_{1-4}$" should read -- $(SO_3H)_{1.4}$ --.

Column 17,
Line 3, "$(SO_3H)_{1-4}$" should read -- $(SO_3H)_{1.4}$ --.

UNITED STATES PATENT AND TRADEMARK OFFICE
CERTIFICATE OF CORRECTION

PATENT NO. : 6,827,434 B1
DATED : December 7, 2004
INVENTOR(S) : Katsuragi et al.

It is certified that error appears in the above-identified patent and that said Letters Patent is hereby corrected as shown below:

<u>Column 22,</u>
Line 67, "of the present embodiment" should be deleted.

<u>Column 23,</u>
Line 19, "that-erosion" should read -- that erosion --.

Signed and Sealed this

Thirtieth Day of May, 2006

JON W. DUDAS
*Director of the United States Patent and Trademark Office*